(12) United States Patent
Yoshino et al.

(10) Patent No.: US 10,012,109 B2
(45) Date of Patent: Jul. 3, 2018

(54) FOIL BEARING, AND FOIL BEARING UNIT AND TURBO MACHINE EACH HAVING SAME

(71) Applicant: NTN CORPORATION, Osaka (JP)

(72) Inventors: Masato Yoshino, Mie (JP); Hiroki Fujiwara, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/102,038

(22) PCT Filed: Nov. 19, 2014

(86) PCT No.: PCT/JP2014/080639
§ 371 (c)(1),
(2) Date: Jun. 6, 2016

(87) PCT Pub. No.: WO2015/087675
PCT Pub. Date: Jun. 18, 2015

(65) Prior Publication Data
US 2016/0312655 A1    Oct. 27, 2016

(30) Foreign Application Priority Data

Dec. 12, 2013 (JP) ................................. 2013-256843
Dec. 12, 2013 (JP) ................................. 2013-256847
Dec. 24, 2013 (JP) ................................. 2013-265439

(51) Int. Cl.
*F16C 27/02* (2006.01)
*F01D 25/16* (2006.01)
(Continued)

(52) U.S. Cl.
CPC ............. *F01D 25/164* (2013.01); *F01D 5/02* (2013.01); *F01D 25/16* (2013.01); *F04D 25/024* (2013.01);
(Continued)

(58) Field of Classification Search
CPC ...... F16C 17/10; F16C 17/024; F16C 17/042; F16C 27/02; F16C 43/02; F16C 2360/24;
(Continued)

(56) References Cited

U.S. PATENT DOCUMENTS 3,809,443 A * 5/1974 Cherubim ............. F16C 17/024
                                                          384/106
4,167,295 A * 9/1979 Glaser ................... F16C 17/042
                                                          384/105
(Continued)

FOREIGN PATENT DOCUMENTS

CN    102797746    11/2012
CN    104884825     9/2015
(Continued)

OTHER PUBLICATIONS

International Preliminary Report on Patentability & Written Opinion of the International Searching Authority dated Jun. 14, 2016 in International (PCT) Application No. PCT/JP2014/080639.
(Continued)

*Primary Examiner* — Alan B Waits
(74) *Attorney, Agent, or Firm* — Wenderoth, Lind & Ponack, L.L.P.

(57) ABSTRACT

A foil bearing includes: a tubular foil holder (31); and a plurality of foils (32) having a radial bearing surface (S1) and being arrayed on an inner peripheral surface (31*a*) of the foil holder (31) in a circumferential direction. Both circumferential ends (projecting portions (32*e*) and projecting portion (32*c*)) of each of the foils (32) are held on the foil holder (31). The foil bearing is configured to support a shaft (6) inserted along an inner periphery thereof in a freely rotatable manner. The plurality of foils (32) are held on the foil holder (31) under a circumferentially movable state.

13 Claims, 19 Drawing Sheets

(51) Int. Cl.

| | | |
|---|---|---|
| *F04D 25/02* | (2006.01) | |
| *F16C 43/02* | (2006.01) | |
| *F16C 17/02* | (2006.01) | |
| *F16C 17/04* | (2006.01) | |
| *F04D 29/051* | (2006.01) | |
| *F04D 29/057* | (2006.01) | |
| *F01D 5/02* | (2006.01) | |
| *F02B 39/14* | (2006.01) | |

(52) U.S. Cl.
CPC ......... *F04D 29/051* (2013.01); *F04D 29/057* (2013.01); *F16C 17/024* (2013.01); *F16C 17/042* (2013.01); *F16C 27/02* (2013.01); *F16C 43/02* (2013.01); *F02B 39/14* (2013.01); *F05D 2220/32* (2013.01); *F05D 2220/40* (2013.01); *F05D 2240/54* (2013.01); *F05D 2240/60* (2013.01); *F16C 2360/24* (2013.01)

(58) Field of Classification Search
CPC .... F04D 29/057; F04D 25/024; F04D 29/051; F01D 25/16; F01D 25/164; F01D 5/02; F02B 39/14; F05D 2220/32; F05D 2220/40; F05D 2240/54; F05D 2240/60
See application file for complete search history.

(56) References Cited

U.S. PATENT DOCUMENTS

| | | | | | |
|---|---|---|---|---|---|
| 4,178,046 | A | * | 12/1979 | Silver | F16C 17/024 384/103 |
| 4,195,395 | A | * | 4/1980 | Silver | F16C 17/024 29/898.02 |
| 4,475,824 | A | * | 10/1984 | Glaser | F16C 17/024 384/106 |
| 5,228,785 | A | * | 7/1993 | Saville | F16C 17/024 384/103 |
| 5,322,371 | A | * | 6/1994 | Signoret | F16C 17/024 384/106 |
| 5,634,723 | A | * | 6/1997 | Agrawal | F16C 17/024 384/103 |
| 5,658,079 | A | * | 8/1997 | Struziak | F16C 17/024 384/106 |
| 5,915,841 | A | * | 6/1999 | Weissert | F16C 17/024 384/104 |
| 6,261,002 | B1 | * | 7/2001 | Ermilov | F16C 17/024 384/105 |
| 6,698,930 | B2 | * | 3/2004 | Akizuki | F16C 17/024 384/106 |
| 6,921,207 | B2 | * | 7/2005 | Matsunaga | F16C 17/042 105/106 |
| 7,108,488 | B2 | * | 9/2006 | Larue | F16C 17/024 384/103 |
| 7,186,026 | B2 | * | 3/2007 | Nagata | F16C 17/024 384/104 |
| 7,553,086 | B2 | * | 6/2009 | Kang | F16C 17/024 384/103 |
| 7,614,792 | B2 | * | 11/2009 | Wade | F16C 17/024 384/103 |
| 8,371,799 | B2 | * | 2/2013 | Spathias | F04D 29/056 415/1 |
| 8,926,182 | B2 | * | 1/2015 | Rosen | F16C 17/024 384/103 |
| 9,011,008 | B2 | * | 4/2015 | Omori | F16C 33/04 384/106 |
| 9,033,579 | B2 | * | 5/2015 | Yoshino | F16C 17/042 384/105 |
| 9,151,322 | B2 | * | 10/2015 | Heshmat | F16C 17/042 |
| 9,206,840 | B2 | * | 12/2015 | Omori | F16C 17/024 |
| 9,360,042 | B2 | * | 6/2016 | Thompson | F16C 17/024 |
| 9,376,959 | B2 | * | 6/2016 | Yoshino | F16C 17/024 |
| 9,394,945 | B2 | * | 7/2016 | Metz | F16C 17/024 |
| 9,551,375 | B2 | * | 1/2017 | Omori | F16C 17/024 |
| 9,568,042 | B2 | * | 2/2017 | Omori | F16C 17/024 |
| 9,644,670 | B2 | * | 5/2017 | McAuliffe | F16C 17/024 |
| 2002/0054718 | A1 | * | 5/2002 | Weissert | F16C 17/024 384/104 |
| 2002/0106138 | A1 | | 8/2002 | Akizuki et al. | |
| 2006/0018574 | A1 | | 1/2006 | Kang et al. | |
| 2007/0211970 | A1 | * | 9/2007 | Nagata | F16C 17/024 384/104 |
| 2007/0246002 | A1 | * | 10/2007 | Taniguchi | F04D 25/0606 123/246 |
| 2011/0243762 | A1 | * | 10/2011 | Daikoku | F04D 25/0606 417/321 |
| 2015/0337894 | A1 | * | 11/2015 | Yoshino | F16C 17/024 384/103 |
| 2016/0186799 | A1 | * | 6/2016 | Yoshino | F01D 25/22 384/105 |
| 2016/0265437 | A1 | | 9/2016 | Yoshino et al. | |
| 2016/0356310 | A1 | * | 12/2016 | Yoshino | F16C 17/10 |
| 2017/0184150 | A1 | | 6/2017 | Yoshino et al. | |

FOREIGN PATENT DOCUMENTS

| | | |
|---|---|---|
| EP | 2 937 584 | 10/2015 |
| JP | 48-18969 | 6/1973 |
| JP | 59-35723 | 3/1984 |
| JP | 1-242815 | 9/1989 |
| JP | 2001-227535 | 8/2001 |
| JP | 2006-57828 | 3/2006 |
| JP | 2008-241015 | 10/2008 |
| JP | 2009-216239 | 9/2009 |
| JP | 2014-119095 | 6/2014 |
| WO | 97/00385 | 1/1997 |

OTHER PUBLICATIONS

International Search Report dated Feb. 24, 2015 in International (PCT) Application No. PCT/JP2014/080639.
Extended European Search Report dated Oct. 9, 2017 in corresponding European Application No. 14869649.5.
Chinese Office Action dated Nov. 16, 2017 in corresponding Chinese Application No. 201480064681.6, with English translation of Chinese Search Report.

* cited by examiner

FOIL BEARING, AND FOIL BEARING UNIT AND TURBO MACHINE EACH HAVING SAME

TECHNICAL FIELD

The present invention relates to a foil bearing configured to support a shaft inserted along an inner periphery thereof in a freely rotatable manner, and to a foil bearing unit and a turbo machine each comprising the foil bearing.

BACKGROUND ART

Bearings configured to support main shafts of turbo machines, such as a gas turbine and a turbocharger, are required to endure severe environments involving high temperature and high speed rotation. Attention has been focused on a foil bearing as a bearing suited to use under such conditions. The foil bearing has bearing surfaces formed of flexible thin films (foils) having low flexural rigidity, and is configured to support a load by allowing the bearing surfaces to be deflected. During the rotation of the shaft, fluid films (such as air films) are formed between an outer peripheral surface of the shaft and the bearing surfaces of the foils, and the shaft is supported in a non-contact manner.

For example, in Patent Literatures 1 and 2, there are disclosed so-called multi-arc foil bearings in which a plurality of foils are arrayed in a circumferential direction, and both circumferential ends of each of the foils are mounted to a foil holder (housing). In those foil bearings, both the circumferential ends of each of the foils are brought into abutment against projecting portions projecting radially inward from an inner peripheral surface of the foil holder (shift suppressing portions 62 in Patent Literature 1 and ridges 70 in Patent Literature 2). In this way, both the circumferential ends of each of the foils are held on the foil holder.

CITATION LIST

Patent Literature 1: JP 2009-216239 A
Patent Literature 2: JP 2006-57828 A

SUMMARY OF INVENTION

Technical Problem

In the foil bearing, an effect of damping vibration of the shaft is obtained due to frictional energy generated by slight sliding between the foils and another member (back foil or foil holder). In the foil bearings in Patent Literatures 1 and 2, however, each of the foils is held from both sides in the circumferential direction by the projecting portions formed on the foil holder. Thus, movement of the foils toward both the sides in the circumferential direction is restricted by the projecting portions of the foil holder. Therefore, the amount of the sliding between the foils and the another member becomes extremely smaller, thereby causing a fear in that the effect of damping the vibration of the shaft is not sufficiently obtained.

It is an object of the present invention to enhance an effect of damping vibration of a shaft, which may be attained by a multi-arc foil bearing.

Further, in the foil bearings as described above, it is necessary to mount the foils one by one between the projecting portions of the foil holder. Thus, the number of steps is increased, and the productivity is poor.

It is another object of the present invention to enhance the productivity of the foil bearing.

Solution to Problem

According to a first aspect of the present invention, which has been made to attain the above-mentioned object, there is provided a foil bearing, comprising: a tubular foil holder; and a plurality of foils arrayed on an inner peripheral surface of the tubular foil holder in a circumferential direction of the tubular foil holder, the plurality of foils being held on the tubular foil holder under a state in which both circumferential ends of each of the plurality of foils are held in contact with the tubular foil holder, the plurality of foils being held on the tubular foil holder under a state in which the plurality of foils are movable relative to the tubular foil holder in the circumferential direction.

As described above, in the foil bearing of the first aspect of the present invention, the foils are held on the foil holder under the circumferentially movable state. That is, both the circumferential ends of each of the foils are not brought into abutment against the foil holder, but the foils are held on the foil holder under a state in which the circumferential movement of the foils is allowed. As described above, the circumferential movement of the foils is allowed so that the amount of sliding between the foils and the foil holder can be increased, thereby being capable of enhancing the effect of damping the vibration of the shaft, which may be attained by the sliding of the foils.

For example, in the foil bearing described above, the tubular foil holder has a plurality of recessed portions formed in the inner peripheral surface of the tubular foil holder. An end portion of the each of the plurality of foils on a downstream side in a rotation direction is inserted into each of the plurality of recessed portions. An end portion of the each of the plurality of foils on an upstream side in the rotation direction is arranged between adjacent one of the plurality of foils and the inner peripheral surface of the tubular foil holder. With this, the foils can be held on the foil holder under the state in which the both circumferential ends of each of the foils are held in contact with the foil holder. In this case, the movement of the foils toward the downstream side in the rotation direction is restricted through abutment of the end portion of each of the foils on the downstream side in the rotation direction against each of the recessed portions. However, the movement of the foils toward the upstream side in the rotation direction is not restricted. With this, the foils are held on the foil holder under the circumferentially movable state. Note that, the "rotation direction" refers to a rotation direction of the shaft supported by the foil bearing (the same applies hereinafter).

In the foil bearing described above, it is preferred that the each of the plurality of recessed portions have a corner portion, which is formed on an inner wall of the each of the plurality of recessed portions, and is configured to allow the end portion of the each of the plurality of foils on the downstream side in the rotation direction to be brought into abutment against the corner portion. The end portion of each of the foils on the downstream side in the rotation direction is brought into abutment against the corner portion. Thus, the end portion of each of the foils on the downstream side in the rotation direction can be arranged at a predetermined circumferential and radial position. With this, deformation of the foils during rotation of the shaft is easily controlled, thereby being capable of stabilizing the bearing performance.

For example, in the foil bearings in Patent Literatures 1 and 2, both the circumferential ends of each of the foils are pressed against the projecting portions formed on the inner peripheral surface of the foil holder. With this, the foils can be protruded radially outward to conform to the inner peripheral surface of the foil holder. On the other hand, in the foil bearing according to the present invention, the circumferential movement of the foils is allowed. Thus, both the circumferential ends of each of the foils cannot be pressed against the foil holder. Therefore, there is a fear in that the foils are protruded radially inward significantly to be held in contact with an outer peripheral surface of the shaft excessively, thereby increasing rotational torque. As a countermeasure, it is preferred that the plurality of foils be protruded radially outward in a manner that adjacent foils among the plurality of foils are pressed against each other in the circumferential direction. With this, the foils can conform to the inner peripheral surface of the foil holder to avoid the increase in rotational torque.

When the shaft supported by the foil bearing is arranged in a direction intersecting with a vertical direction (for example, horizontal direction), the shaft is lowered by gravity during low speed rotation at the time of, for example, start or stop of the shaft. Thus, the shaft is held in sliding contact with a lower portion of the foil bearing. In this case, when the foils are fixed to the foil holder in the circumferential direction as in Patent Literatures 1 and 2, the shaft is held in sliding contact with the same part of each of the foils during the low speed rotation of the shaft, thereby causing a fear of locally wearing the foils. As a countermeasure, when the foils are movable relative to the foil holder in the circumferential direction as described above, the sliding contact positions between each of the foils and the shaft can be distributed, thereby being capable of suppressing the local wear of the foils.

Further, according to a second aspect of the present invention, which has been made to attain the above-mentioned object, there is provided a foil bearing, comprising: a tubular foil holder; and a plurality of foils arrayed on an inner peripheral surface of the tubular foil holder in a circumferential direction of the tubular foil holder, the plurality of foils being held on the tubular foil holder under a state in which both circumferential ends of each of the plurality of foils are held in contact with the tubular foil holder. The tubular foil holder has a recessed portion formed in the inner peripheral surface of the tubular foil holder. A part of a circumferential region of the each of the plurality of foils is allowed to be curved in the recessed portion.

According to this foil bearing, during rotation of the shaft, a part of the circumferential region of each of the foils is curved in the recessed portion formed in the inner peripheral surface of the foil holder. Thus, correspondingly to the curving degree of the foils, the other region of each of the foils can be moved in the circumferential direction. With this, the amount of sliding between the foils and the foil holder is increased, thereby being capable of enhancing the effect of damping the vibration of the shaft, which may be attained by the sliding of the foils.

In the foil bearing described above, an end portion of the each of the plurality of foils on a downstream side in a rotation direction may be inserted into the recessed portion. In this case, the end portion of each of the foils on the downstream side in the rotation direction and the recessed portion are engaged with each other in the circumferential direction. Thus, the movement of the foils toward the downstream side in the rotation direction can be restricted at a predetermined position. Note that, the "rotation direction" refers to a rotation direction of the shaft supported by the foil bearing (the same applies hereinafter).

In the foil bearing described above, it is preferred that the circumferential end portions of adjacent foils be intersected with each other in an axial view to form an intersecting portion, and that both the circumferential ends of each of the foils be arranged on a radially outer side with respect to the adjacent one of the foils. With this, a bearing surface can be formed over the entire periphery of the inner peripheral surface of the foil holder.

When a circumferential width of the recessed portion formed in the inner peripheral surface of the foil holder is excessively small, there is a fear in that a part of the circumferential region of each of the foils cannot be curved in the recessed portion. Therefore, it is necessary that the recessed portion have a circumferential width that allows each of the foils to be curved in the recessed portion. For example, when the circumferential end portions of the foils are intersected with each other as described above, it is preferred that a circumferential width of an opening portion of the recessed portion be set so that an end portion of the opening portion of the recessed portion on an upstream side in the rotation direction is arranged on the upstream side in the rotation direction with respect to the intersecting portion.

In the foil bearing described above, it is preferred that the recessed portion have a corner portion, which is formed on an inner wall of the recessed portion, and is configured to allow the end portion of the each of the plurality of foils on the downstream side in the rotation direction to be brought into abutment against the corner portion. In this case, the end portion of each of the foils on the downstream side in the rotation direction is brought into abutment against the corner portion. Thus, the end portion of each of the foils on the downstream side in the rotation direction can be arranged at a predetermined position. With this, the deformation of the foils during the rotation of the shaft is easily controlled so that a bearing surface having a desired shape is easily obtained, thereby being capable of stabilizing the bearing performance.

Each of the foils of the foil bearing described above is arranged substantially along the inner peripheral surface of the foil holder, and the end portion of each of the foils is inserted into the recessed portion. At this time, in order that the end portion of each of the foils is brought into abutment against the corner portion, it is preferred that the corner portion be formed on or in the vicinity of a tangent line L tangent to the inner peripheral surface of the foil holder at a tangent point being the end portion of the opening portion of the groove on the upstream side in the rotation direction (see FIG. 5A). Specifically, for example, it is preferred that the corner portion of the groove be formed in a region between the inner peripheral surface of the foil holder and a straight line L' obtained by turning the tangent line L described above about the tangent point toward the radially outer side by 10°.

When the foil bearing described above and a rotary member inserted along the inner periphery of the foil bearing are unified into a foil bearing unit, the foil bearing and the rotary member can be handled as a single component, thereby facilitating assembly into a turbo machine or other devices.

The foil bearing described above is suitably applicable to, for example, the turbo machine.

Further, according to a third aspect of the present invention, which has been made to attain the above-mentioned another object, there is provided a foil bearing, comprising: a foil holder having a plurality of grooves formed in an inner peripheral surface of the foil holder; and a plurality of foils each comprising: a body portion having a bearing surface; an insertion portion formed at one circumferential end portion of each of the plurality of foils; and a mounting portion formed at another circumferential end portion of the each of the plurality of foils, the insertion portion of the each of the plurality of foils being inserted into each of the plurality of grooves of the foil holder, the insertion portion of adjacent one of the plurality of foils being mounted to the mounting portion of the each of the plurality of foils.

Further, according to the third aspect of the present invention, which has been made to attain the above-mentioned another object, there is provided a method of assembling a foil bearing, the foil bearing comprising: a foil holder having a plurality of grooves formed in an inner peripheral surface of the foil holder; and a plurality of foils each comprising: a body portion having a bearing surface; an insertion portion formed at one circumferential end portion of each of the plurality of foils; and a mounting portion formed at another circumferential end portion of the each of the plurality of foils, the method comprising the steps of: temporarily assembling the plurality of foils into a tubular shape by mounting the insertion portion of adjacent one of the plurality of foils to the mounting portion of the each of the plurality of foils; and inserting the plurality of temporarily assembled foils along an inner periphery of the foil holder while inserting the insertion portion of the each of the plurality of foils into each of the plurality of grooves.

Still further, according to the third aspect of the present invention, which has been made to attain the above-mentioned another object, there is provided a foil to be mounted to an inner peripheral surface of a foil holder, the foil comprising: a body portion having a bearing surface; an insertion portion, which is formed at one circumferential end portion of the foil, and is configured to be inserted into a groove formed in the inner peripheral surface of the foil holder; and a mounting portion, which is formed at another circumferential end portion of the foil, and is configured to allow the insertion portion of adjacent one of the foils to be mounted thereto.

As described above, in the foil bearing of the third aspect of the present invention, the insertion portion configured to be inserted into the groove of the foil holder is formed at one circumferential end portion of the foil, and the mounting portion configured to allow the insertion portion of the adjacent one of the foils to be mounted thereto is formed at another circumferential end portion of the foil. With this, the insertion portion of the adjacent one of the foils is mounted to the mounting portion of each of the foils, thereby being capable of temporarily assembling the plurality of foils into the tubular shape. The plurality of foils temporarily assembled in this way are inserted along the inner periphery of the foil holder while inserting the insertion portion of each of the foils into the groove, thereby being capable of mounting the plurality of foils to the foil holder at a time.

At this time, when at least one axial end portion of each of the grooves is opened to an end surface of the foil holder, the insertion portion of each of the foils can be inserted from the one axial side under a state in which the plurality of foils are temporarily assembled into the tubular shape.

In the foil bearing described above, the plurality of foils are mounted to the foil holder by only inserting the insertion portion of each of the foils into each of the grooves of the foil holder. Thus, the foils are movable relative to the foil holder. In this case, when the shaft is inserted into or removed from the inner periphery of the foil bearing at the time of assembly or maintenance, there is a fear in that the foils and the shaft are held in sliding contact with each other in the axial direction to cause shift of the foils relative to the foil holder in the axial direction (in particular, toward an opening side of the grooves).

As a countermeasure, it is preferred that a locking member engageable with the insertion portion of each of the foils from the one axial side (opening side of the grooves) be mounted to the foil holder. As described above, the foils and the locking member are engaged with each other in the axial direction, thereby being capable of restricting axial movement of the foils relative to the foil holder. In this case, when the locking member is to be engaged with the body portion of each of the foils, it is necessary that the locking member be projected on the radially inner side with respect to the inner peripheral surface of the foil holder, thereby causing a fear in that the locking member and the shaft interfere with each other. As a countermeasure, as described above, when the locking member is engaged with the insertion portion of each of the foils, the locking member can be arranged in a radial region of each of the grooves, thereby being capable of avoiding the interference between the locking member and the shaft.

In the foil bearing described above, when one axial end portion of the body portion is extended more toward the one axial side than one axial end portion of the insertion portion, the area of the bearing surface is increased, thereby enhancing the bearing performance.

In this case, the body portion of the foil is arranged on the radially inner side with respect to the locking member. Thus, when the shaft is centrifugally whirled, the body portion of the foil is sandwiched between an outer peripheral surface of the shaft and a radially inner surface of the locking member, thereby causing a fear of wear of the foils or damage to the foils. As a countermeasure, the radially inner surface of the locking member is arranged on the radially outer side with respect to the inner peripheral surface of the foil holder. With this, when the shaft is centrifugally whirled to be brought into contact with the foils, the foils can be bent radially outward. Thus, excessive interference between the shaft and the foils can be prevented to suppress the wear of the foils or the damage to the foils.

Further, the radially inner surface of the locking member may be gradually increased in diameter as approaching to the one axial side. In this case, a region on the one axial side of the inner peripheral surface of the locking member is retreated toward the radially outer side with respect to the radially inner surface of the foil holder, thereby being capable of preventing the excessive interference between the shaft and the foils. Further, an end portion of the locking member on another axial side, which is configured to be engaged with the insertion portion of each of the foils, can be extended radially inward so that an engaging region between the insertion portion and the locking member is increased, thereby being capable of securely retaining the foils.

Advantageous Effects of Invention

As described above, according to the foil bearing of the first aspect of the present invention, the foils are movable in the circumferential direction. Thus, the amount of the sliding between the foils and the foil holder is increased, thereby being capable of enhancing the effect of damping the vibration of the shaft.

Further, according to the foil bearing of the second aspect of the present invention, apart of the circumferential region of each of the foils is curved. Thus, the amount of the sliding between the foils and the foil holder is increased, thereby being capable of enhancing the effect of damping the vibration of the shaft.

Further, according to the third aspect of the present invention, the number of assembly steps for the foil bearing is reduced as compared to the related art in which the foils are mounted to the foil holder one by one, thereby being capable of enhancing the productivity.

DESCRIPTION OF EMBODIMENTS

Now, embodiments of a first aspect of the present invention and a second aspect of the present invention are described with reference to FIG. 1 to FIG. 18.

Figure 1:
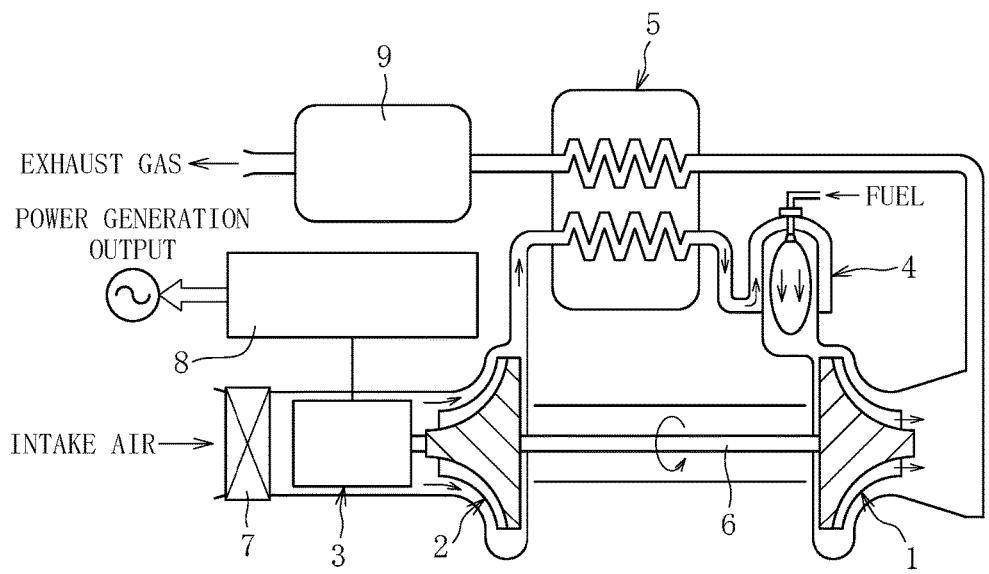
FIG. 1 is a schematic view for illustrating a configuration of a gas turbine.

FIG. 1 is a schematic illustration of a configuration of a gas turbine as a type of a turbo machine. The gas turbine mainly comprises a turbine 1 and a compressor 2, which comprise blade cascades, a power generator 3, a combustor 4, and a regenerator 5. The turbine 1, the compressor 2, and the power generator 3 comprise a common shaft 6 extending in a horizontal direction. The shaft 6, the turbine 1, and the compressor 2 serve as an integrally rotatable rotor. Air sucked from an air-intake port 7 is compressed by the compressor 2, heated by the regenerator 5, and then fed into the combustor 4. The compressed air is mixed with fuel and combusted so as to rotate the turbine 1 with a high-temperature and high-pressure gas. A rotational force of the turbine 1 is transmitted to the power generator 3 through intermediation of the shaft 6 so as to rotate the power generator 3. In this way, electric power is generated and output through intermediation of an inverter 8. The gas having rotated the turbine 1 has a relatively high temperature. Thus, the gas is fed into the regenerator 5 so that heat thereof is exchanged with that of the compressed air prior to the combustion. In this way, the heat of the gas after the combustion is reused. The gas that has been subjected to the heat exchange in the regenerator 5 passes through an exhaust heat recovery device 9, and then is exhausted as an exhaust gas.

Figure 2:
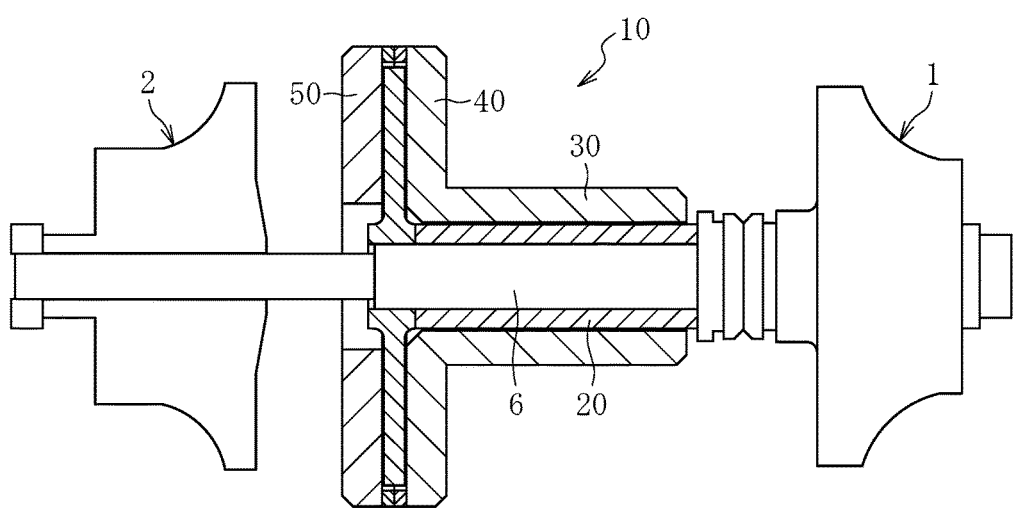
FIG. 2 is a sectional view for illustrating the support structure for a rotor of the gas turbine.

FIG. 2 is an illustration of a foil bearing unit 10 configured to support the shaft 6 of the rotor in the gas turbine. The foil bearing unit 10 comprises a rotary member 20 fixed to the shaft 6, a radial foil bearing 30 configured to support the shaft 6 and the rotary member 20 in a radial direction, and a first thrust foil bearing 40 and a second thrust foil bearing 50 configured to support the shaft 6 and the rotary member 20 in thrust directions.

Figure 3:
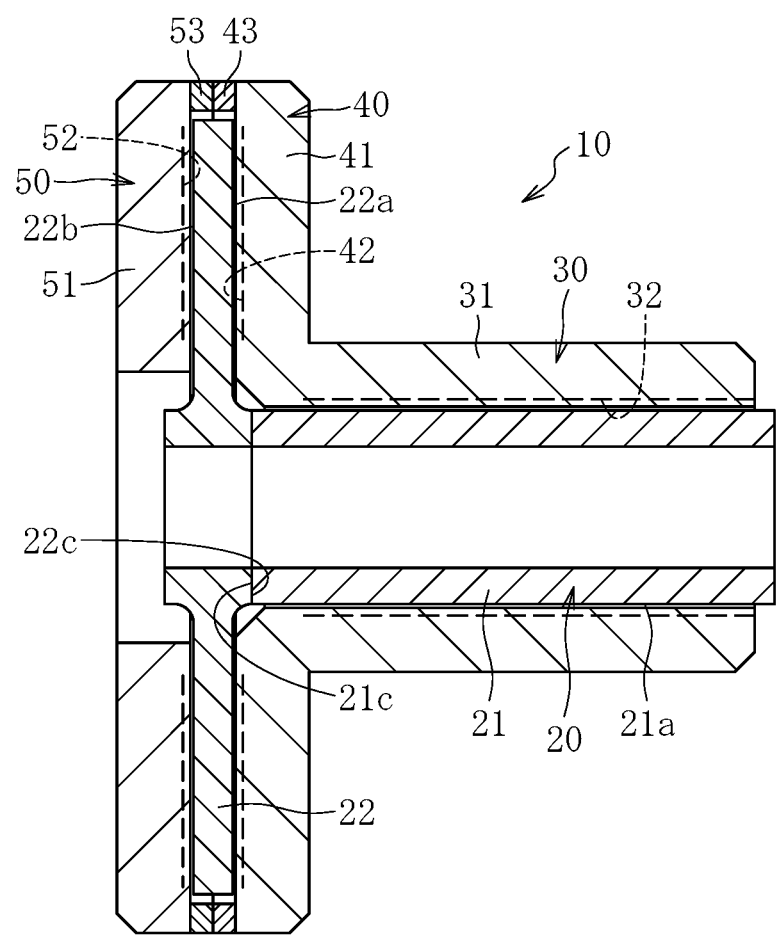
FIG. 3 is a sectional view for illustrating a foil bearing unit, which is assembled in the support structure.

As illustrated in FIG. 3, the rotary member 20 comprises a sleeve portion 21, and a disc-like flange portion 22 projecting radially outward from the sleeve portion 21. The flange portion 22 is made, for example, of a carbon fiber reinforced composite, and the sleeve portion 21 is made, for example, of a sintered carbon material.

Figure 4:
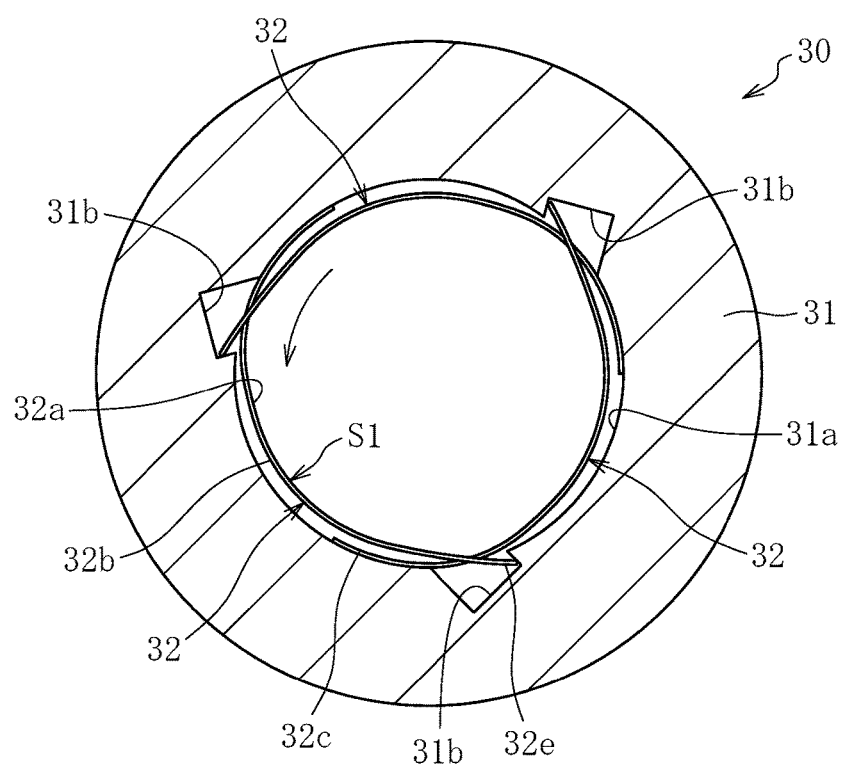
FIG. 4 is a sectional view for illustrating a foil bearing (radial foil bearing) according to embodiments of a first aspect of the present invention and a second aspect of the present invention, which is assembled in the foil bearing unit.

As illustrated in FIG. 4, the radial foil bearing 30 being a foil bearing according to an embodiment of the present invention comprises a foil holder 31 having a tubular shape (cylindrical shape in the illustrated example), and a plurality of foils 32 (three foils 32 in the illustrated example) mounted to an inner peripheral surface of the foil holder 31. The plurality of foils 32 are arrayed on the inner peripheral surface of the foil holder 31 in a circumferential direction.

Grooves 31b being recessed portions are formed in an inner peripheral surface 31a of the foil holder 31. In this embodiment, the grooves 31b each extending in an axial direction are formed in the foil holder 31 at a plurality of equiangular positions (three equiangular positions in the illustrated example). Each of the grooves 31b is formed at least in an axial region of an end portion of each of the foils 32 on a downstream side in a rotation direction (projecting portions 32e described later). In this embodiment, the grooves 31b are each formed over an entire axial length of the foil holder 31.

Figure 5A:
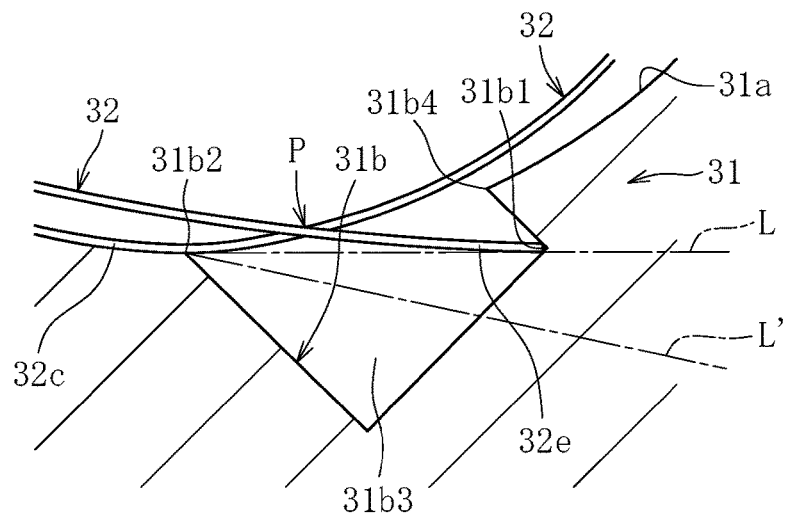
FIG. 5A is a sectional view for illustrating the vicinity of a groove of a foil holder of the radial foil bearing under a state in which a shaft is stopped.

The grooves 31b each have an internal space configured to allow the foil 32 to be curved. In this embodiment, as illustrated in FIG. 5A, a space 31b3 is secured on a radially outer side with respect to a straight line connecting a corner portion 31b1 of the groove 31b and an end portion 31b2 of an opening portion of the groove 31b on an upstream side in the rotation direction. The corner portion 31b1 is formed on an inner wall of the groove 31b, and is configured to allow the end portion of each foil 32 on the downstream side in the rotation direction (projecting portions 32e) to be brought into abutment thereagainst. The corner portion 31b1 is formed on or in the vicinity of a tangent line L tangent to the inner peripheral surface 31a of the foil holder 31 at the end portion 31b2 of the opening portion of the groove 31b on the upstream side in the rotation direction. Specifically, the corner portion 31b1 is formed in a region between the inner peripheral surface 31a of the foil holder 31 and a straight line L' obtained by turning the tangent line L about the tangent point (end portion 31b2) toward the radially outer side by 10° (desirably, 5°). In the illustrated example, the corner portion 31b1 is formed substantially on the tangent line L. The corner portion 31b1 may be formed in a region on the inner peripheral surface 31a side of the foil holder 31 with respect to the tangent line L. In this case, an angle of an end portion 31b4 of the groove 31b on the downstream side in the rotation direction may be smaller than that in the illustrated example, thereby causing a fear in that the end portion 31b4 may be damaged. Thus, it is necessary that a position of the corner portion 31b1 be set in such a range that the end portion 31b4 may have a sufficient strength.

The foil holder 31 is integrally formed including the grooves 31b through die molding. The foil holder 31 of this embodiment is integrally formed through die molding of a sintered metal. In this embodiment, a circumferential dimension of each of the grooves 31b is relatively large. Thus, a circumferential thickness of a molding die for forming the grooves 31b is increased, thereby being capable of preventing damage to the molding die. When the foil bearing unit 10 is used under a relatively low temperature environment, the foil holder 31 may be formed through die molding of a resin.

Figure 6A:
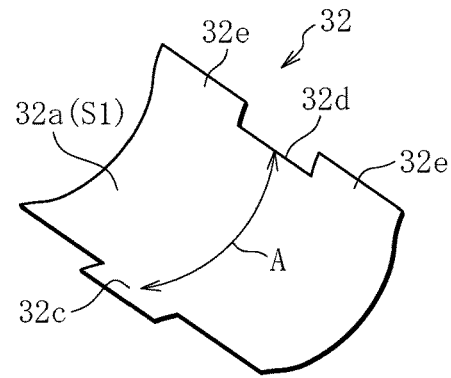
FIG. 6A is a perspective view for illustrating a foil of the radial foil bearing.
Figure 6B:
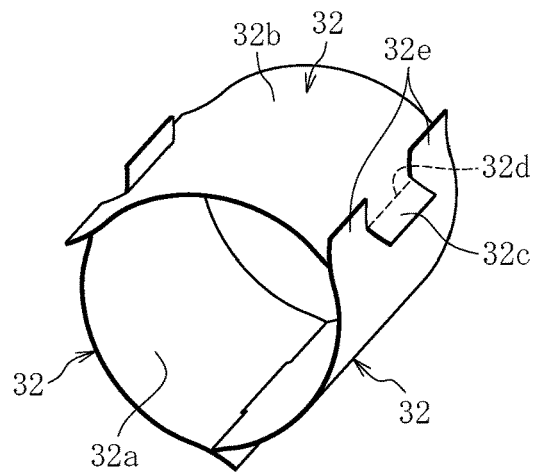
FIG. 6B is a perspective view for illustrating a state in which three foils illustrated in FIG. 6A are temporarily assembled.

As illustrated in FIG. 6A, each of the foils 32 comprises a projecting portion 32c formed at one circumferential end, and a recessed portion 32d formed at another circumferential end. The projecting portion 32c and the recessed portion 32d of each of the foils 32 are formed at the same position in the axial direction. As illustrated in FIG. 6B, the projecting portion 32c of each of the foils 32 may be fitted to the recessed portion 32d of adjacent one of the foils 32, thereby temporarily assembling the three foils 32 into a tubular shape. In this case, in the axial view illustrated in FIG. 4, the one circumferential end (projecting portion 32c) of each of the foils 32 and the another circumferential end (projecting portions 32e on both axial sides of the recessed portion 32d) of the adjacent one of the foils 32 are intersected with each other. In this state, both the circumferential ends of each of the foils 32 are held on the foil holder 31. Specifically, the projecting portions 32e at the another circumferential end of each of the foils 32 are inserted into each of the grooves 31b of the foil holder 31. The projecting portion 32c at the one circumferential end of each of the foils 32 is arranged between a radially outer surface 32b of the adjacent one of the foils 32 and the inner peripheral surface 31a of the foil holder 31. In this case, movement of the plurality of foils 32 toward the downstream side in the rotation direction is restricted through abutment of the projecting portions 32e of each of the foils 32 against each of the corner portions 31b1 of the grooves 31b. On the other hand, movement of the plurality of foils 32 toward the upstream side in the rotation direction is not restricted. With this, the plurality of foils 32 are movable relative to the foil holder 31 in the circumferential direction.

Radially inner surfaces 32a of the foils 32 function as a radial bearing surface S1 (see FIG. 4). In the illustrated example, three foils 32 form a multi-arc radial bearing surface S1. Members (such as back foils) configured to impart elasticity to the foils 32 are not arranged between the inner peripheral surface 31a of the foil holder 31 and the foils 32 so that the radially outer surface 32b of each of the foils 32 and the inner peripheral surface 31a of the foil holder 31 are slidable relative to each other. The projecting portion 32c of each of the foils 32 is arranged on the radially outer side with respect to a part corresponding to the radial bearing surface S1 of the adjacent one of the foils 32 so that the projecting portion 32c functions as an underfoil portion.

End portions of the adjacent foils 32 are pressed against each other in the circumferential direction. Specifically, at an intersecting portion P (see FIG. 5A), the recessed portion 32d of one foil 32 and a root portion of the projecting portion 32c of another foil 32 are engaged with each other in the circumferential direction (see FIG. 6B). At this time, through appropriate setting of a circumferential dimension A of the part corresponding to the radial bearing surface S1 of each of the foils 32 (see FIG. 6A), the plurality of temporarily assembled foils 32 are protruded radially outward to form substantially a cylindrical shape, and the foils 32 are extended along the inner peripheral surface 31a of the foil holder 31.

As illustrated in FIG. 3, the first thrust foil bearing 40 is configured to support the flange portion 22 of the rotary member 20 from one axial side (right side in FIG. 3), and comprises a disc-like foil holder 41, and a plurality of foils 42 fixed to an end surface 41a of the foil holder 41. In this embodiment, the foil holder 41 of the first thrust foil bearing 40 and the foil holder 31 of the radial foil bearing 30 are formed integrally with each other.

Figure 7:
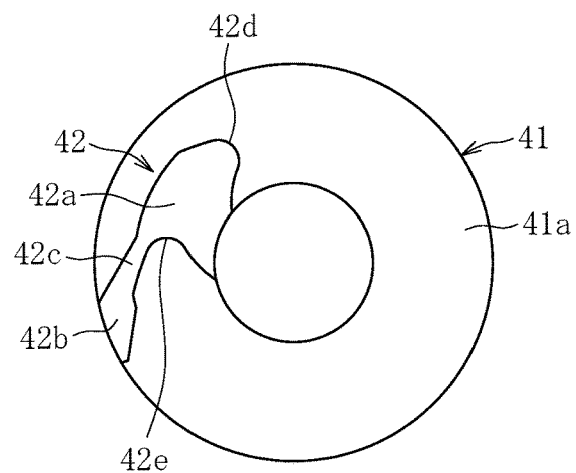
FIG. 7 is a plan view for illustrating a foil and a foil holder of a first thrust foil bearing assembled in the foil bearing unit.

As illustrated in FIG. 7, each of the foils 42 of the first thrust foil bearing 40 integrally comprises a body portion 42a, a fixing portion 42b arranged on a radially outer side with respect to the body portion 42a, and a coupling portion 42c configured to couple the body portion 42a and the fixing portion 42b to each other. An edge 42d of the body portion 42a on a downstream side in the rotation direction, and an edge 42e of the body portion 42a on an upstream side in the rotation direction each comprise a central portion that is formed into a substantially V-shape projecting to the downstream side in the rotation direction. The central portion of each of the edges 42d and 42e of the body portion 42a is rounded into a circular-arc shape.

Figure 8A:
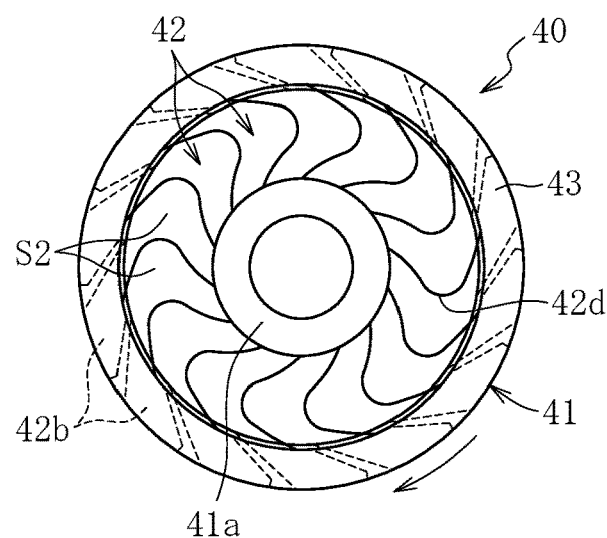
FIG. 8A is a plan view for illustrating the first thrust foil bearing.
Figure 9:
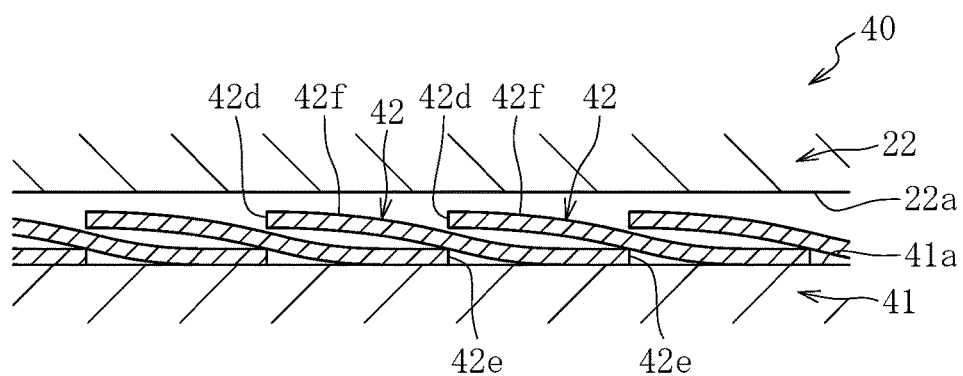
FIG. 9 is a sectional view for illustrating the first thrust foil bearing.

As illustrated in FIG. 8A, the fixing portions 42b of the foils 42 are fixed to a radially outer rim of the end surface 41a of the foil holder 41. In the illustrated example, the fixing portions 42b of the plurality of foils 42 are arranged on the same circumference, and entire regions of the fixing portions 42b are fixed by being sandwiched between a ring-shaped fixing member 43 and the end surface 41a of the foil holder 41. The plurality of foils 42 are arranged at a circumferentially constant pitch. In the illustrated example, the foils 42 are overlapped with each other in a phase shifted by an amount corresponding to half of the foils 42. As illustrated in FIG. 9, each of the edges 42d of the foils 42 on the downstream side in the rotation direction is arranged on adjacent one of the foils 42 (on the flange portion 22 side). In other words, downstream portions of the foils 42 in the rotation direction override on upstream portions of adjacent foils 42 in the rotation direction. Parts of surfaces of the body portions 42a of the foils 42, which directly face one end surface 22a of the flange portion 22 (parts illustrated in FIG. 8A), function as a thrust bearing surface S2. The fixing portions 42b of the foils 42 may be fixed to the foil holder 41 or the fixing member 43 through welding, bonding, or other methods.

Figure 8B:
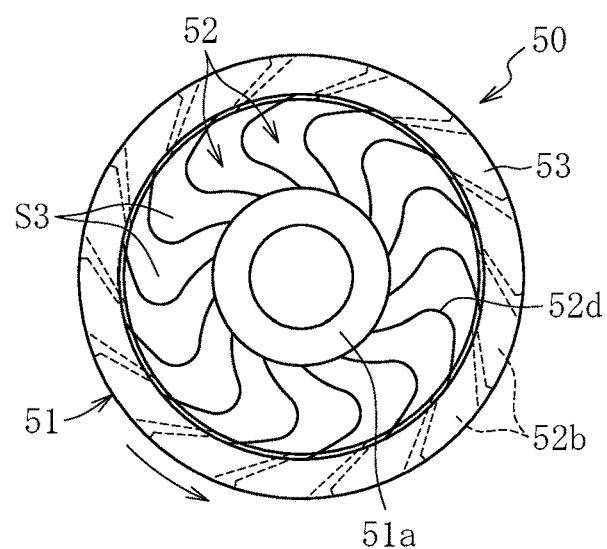
FIG. 8B is a plan view for illustrating a second thrust foil bearing assembled in the foil bearing unit.

As illustrated in FIG. 3, the second thrust foil bearing 50 is configured to support the flange portion 22 of the rotary member 20 from another axial side (left side in FIG. 3). As illustrated in FIG. 8B, the second thrust foil bearing 50 comprises a disc-like foil holder 51, and a plurality of foils 52 fixed to an end surface 51a of the foil holder 51. Parts of surfaces of body portions of the foils 52, which directly face another end surface 22b of the flange portion 22 (parts illustrated in FIG. 8B), function as a thrust bearing surface S3. Other features of the second thrust foil bearing 50 are the same as those of the first thrust foil bearing 40, and hence redundant description thereof is omitted.

Each of the foils 32, 42, and 52 is formed through press working on a metal foil made of a metal that is excellent in resiliency and processability, such as a steel material or a copper alloy, and having a thickness of from approximately 20 μm to approximately 200 μm. As in this embodiment, in the air dynamic pressure bearing that uses air as a fluid film, a lubricating oil does not exist in an atmosphere. Thus, it is preferred that the metal foil be made of stainless steel or bronze.

The foil bearing unit 10 having the configuration described above is assembled by the procedure as described below. First, the sleeve portion 21 of the rotary member 20 is inserted along an inner periphery of the radial foil bearing 30. After that, the second thrust foil bearing 50 is mounted to the first thrust foil bearing so that the flange portion 22 of the rotary member 20 is sandwiched from both the axial sides. Specifically, the fixing member 43 mounted to the foil holder 41 of the first thrust foil bearing 40 and a fixing member 53 mounted to the foil holder 51 of the second foil bearing 50 are held in abutment against each other in the axial direction, and in this state, both the foil holders 41 and 51 are fixed with bolts or other fasteners (not shown). In this way, the foil bearing unit 10 illustrated in FIG. 3 is completed.

The shaft 6 is press-fitted to an inner periphery of the rotary member 20, and a part or an entirety of each of the foil holders 31, 41, and 51 of the foil bearings 30, 40, and 50 is fixed to a housing of the gas turbine. With this, the foil bearing unit 10 having the configuration described above is assembled into the gas turbine. In the foil bearing unit 10, the rotary member 20 is received in a bearing member comprising the radial foil bearing 30 and the thrust foil bearings 40 and 50, and the bearing member and the rotary member 20 are integrated with each other with the separation therebetween being restricted. Thus, the bearing member and the rotary member 20 may be handled as a single component at the time of assembly into the gas turbine, and hence assembly efficiency may be enhanced.

When the shaft 6 is rotated to one side in the circumferential direction (direction of the arrow in each of FIG. 4 and FIG. 8), a radial bearing gap is formed between the radial bearing surface S1 of the foils 32 of the radial foil bearing 30 and an outer peripheral surface 21a of the sleeve portion 21 of the rotary member 20, and a pressure of an air film formed in the radial bearing gap allows the rotary member 20 and the shaft 6 to be supported in the radial direction. At the same time, thrust bearing gaps are formed respectively between the thrust bearing surface S2 of the foils 42 of the first thrust foil bearing 40 and the one end surface 22a of the flange portion 22 of the rotary member 20, and between the thrust bearing surface S3 of the foils 52 of the second thrust foil bearing 50 and the another end surface 22b of the flange portion 22 of the rotary member 20. Pressures of air films formed in the thrust bearing gaps allow the rotary member 20 and the shaft 6 to be supported in both the thrust directions.

At this time, due to flexibilities of the foils 32, 42, and 52, the bearing surfaces S1, S2, and S3 of the foils 32, 42, and 52 are arbitrarily deformed in accordance with operating conditions such as a load, a rotation speed of the shaft 6, and an ambient temperature. Thus, the radial bearing gap and the thrust bearing gaps are automatically adjusted so as to have appropriate widths in accordance with the operating conditions. As a result, even under severe conditions involving high temperature and high speed rotation, the radial bearing gap and the thrust bearing gaps may be managed so as to have optimum widths, and hence the rotary member 20 and the shaft 6 may be stably supported.

Figure 10:
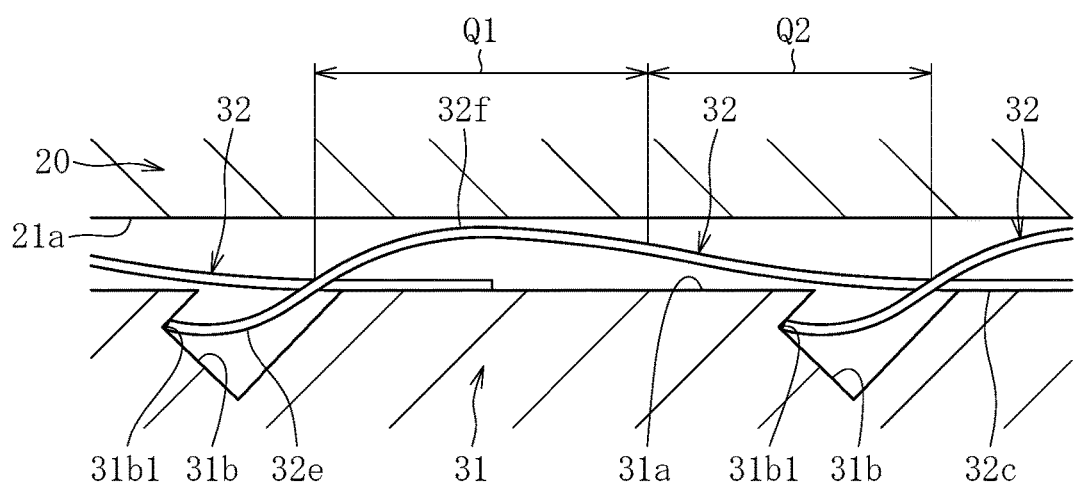
FIG. 10 is a sectional view for illustrating the radial foil bearing, which is obtained by converting a circumferential direction into a linear direction.

In this embodiment, due to friction with a fluid (air) flowing along with rotation of the shaft 6, the foils 32 are pressed toward the downstream side in the rotation direction. Then, as illustrated in FIG. 10, the one circumferential end of each of the foils 32 of the radial foil bearing 30 is separated from the inner peripheral surface 31a of the foil holder 31. On the other hand, the another circumferential end of each of the foils 32 is arranged along the inner peripheral surface 31a of the foil holder 31. Therefore, a top portion 32f of each of the foils 32 (region closest to an outer peripheral surface of the rotary member 20) is arranged on the downstream side in the rotation direction with respect to a central portion of a circumferential intermediate region between the plurality of grooves 31b. With this, in the radial bearing gap formed between each of the foils 32 and the outer peripheral surface 21a of the rotary member 20, a region in which a positive pressure is generated, that is, a region gradually narrowed toward the downstream side in the rotation direction (left side in FIG. 10) can be secured wide, thereby enhancing supportability in the radial direction.

The adjacent foils 32 among the plurality of foils 32, which are assembled in the foil holder 31, are pressed against each other in the circumferential direction at the intersecting portion so that the foils 32 are extended along the inner peripheral surface 31a of the foil holder 31. Therefore, sliding contact between the foils 32 and the rotary member 20 is suppressed, thereby being capable of reducing rotational torque.

During operation of the bearing, due to an influence of the air films formed in the bearing gaps, the foils 32, 42, and 52 are pressed against the foil holders 31, 41, and 51, respectively. Along with this, slight sliding occurs between each of the foils 32, 42, and 52 and each of the foil holders 31, 41, and 51. Due to frictional energy generated by the slight sliding, vibration of the shaft 6 can be damped. In this embodiment, the foils 32 of the radial foil bearing 30 are not fixed to the foil holder 31 in the circumferential direction. Thus, the foils 32 are movable relative to the foil holder 31 in the circumferential direction so that the amount of the sliding between the foils 32 and the foil holder 31 is increased, thereby further enhancing the effect of damping the vibration of the shaft 6. In the illustrated example, the end portion of each of the foils 32 on the upstream side in the rotation direction (projecting portion 32c) is arranged between the adjacent one of the foils 32 and the inner peripheral surface 31a of the foil holder 31. Thus, the foils 32 are caused to slide in the circumferential direction under a state of being held in surface contact with the inner peripheral surface 31a of the foil holder 31, thereby further enhancing the effect of damping the vibration of the shaft 6.

Figure 5B:
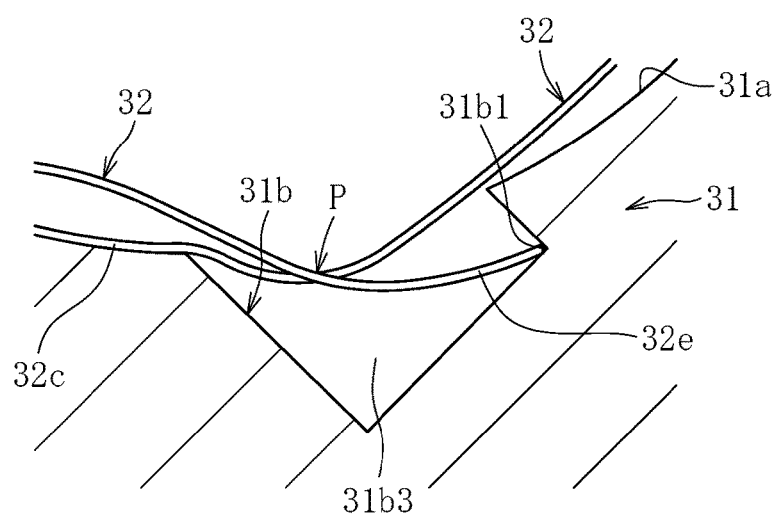
FIG. 5B is a sectional view for illustrating the vicinity of the groove of the foil holder of the radial foil bearing under a state in which the shaft is rotated.

In this embodiment, as illustrated in FIG. 5A, the recessed portions (grooves 31b) each having a relatively large circumferential width are formed in the inner peripheral surface 31a of the foil holder 31, thereby being capable of actively moving the foils 32 in the circumferential direction. That is, when the shaft 6 is rotated, due to the friction with the fluid (air) flowing along with the rotation of the shaft 6, the foils 32 are pressed toward the downstream side in the rotation direction as illustrated in FIG. 5B. At this time, a part of the circumferential region of each of the foils 32 is curved by being pressed against each of the grooves 31b. Specifically, along with the rotation of the shaft 6, distal ends of the projecting portions 32e of each of the foils 32 are brought into abutment against the corner portion 31b1 of each of the grooves 31b, and the end portion of each of the foils 32 on the downstream side in the rotation direction including the projecting portions 32e is curved. In the illustrated example, the end portion of each of the foils 32 on the downstream side in the rotation direction is curved so as to be convexed radially outward. The end portion of each of the foils 32 on the downstream side in the rotation direction is curved at a curvature larger than that of the other region, for example, is curved at a curvature larger than that of the inner peripheral surface 31a of the foil holder 31. The end portion of each of the foils 32 is curved in this way, and correspondingly, the other region of each of the foils 32 (circumferential region other than the projecting portions 32e) is moved toward the downstream side in the rotation direction. With this, the amount of the sliding between the foils 32 and the foil holder 31 is increased, thereby further enhancing the effect of damping the vibration of the shaft 6.

At this time, when the circumferential width of each of the grooves 31b of the foil holder 31 is excessively small, the projecting portions 32e of each of the foils 32 cannot be curved in each of the grooves 31b, thereby causing a fear in that the effect of damping the vibration of the shaft 6 is not sufficiently obtained. Therefore, the circumferential width of each of the grooves 31b, in particular, the circumferential width of the opening portion of each of the grooves 31b is required to be set so as to allow the projecting portions 32e to be curved. For example, it is preferred that the circumferential width of the opening portion of each of the grooves 31b be set to be 5% or more of the circumferential dimension A of the part corresponding to the bearing surface S1 of each of the foils 32 (see FIG. 6A). In this embodiment, the circumferential width of each of the grooves 31b is set so that the intersecting portion P between the circumferential end portions of the adjacent foils 32 is arranged in a circumferential region of the opening portion of each of the grooves 31b. Specifically, the end portion 31b2 of the opening portion of each of the grooves 31b on the upstream side in the rotation direction is arranged on the upstream side in the rotation direction (left side in FIG. 5) with respect to the intersecting portion P between the foils 32. Further, in this embodiment, the circumferential width of the opening portion of each of the grooves 31b is larger than a circumferential dimension of each of the projecting portions 32e of each of the foils 32. When the circumferential width of each of the grooves 31b is excessively large, a circumferential region of each of the foils 32, which enters each of the grooves 31b, is excessively large so that the contact area between each of the foils 32 and the foil holder 31 is reduced, thereby causing a fear of reducing the effect of damping the vibration of the shaft 6, which may be attained by the sliding between the foils 32 and the foil holder 31. Therefore, it is preferred that the circumferential width of each of the grooves 31b, in particular, the circumferential width of the opening portion of each of the grooves 31b be set in such a range that the contact area between each of the foils 32 and the foil holder 31 may be sufficiently secured. For example, it is preferred that the circumferential width of the opening portion of each of the grooves 31b be 30% or less of the circumferential dimension A of the part corresponding to the bearing surface S1 of each of the foils 32.

During the low speed rotation immediately before the stop or immediately after the actuation of the shaft 6, the bearing surfaces S1 to S3 of the foils and the rotary member 20 come into sliding contact with each other. Thus, low-friction coating such as a DLC film, a titanium aluminum nitride film, a tungsten disulfide film, and a molybdenum disulfide film may be formed on one or both of the bearing surfaces S1 to S3 of the foils and the rotary member 20. Further, in order to adjust a frictional force that is generated by the slight sliding between each of the foils 32, 42, and 52 and each of the foil holders 31, 41, and 51, the low-friction coating as described above may be formed on one or both of each of the foils 32, 42, and 52 and each of the foil holders 31, 41, and 51.

The present invention is not limited to the embodiment described above. Now, description is made of other embodiments of the present invention. Parts having the same functions as those in the embodiment described above are denoted by the same reference symbols, and redundant description thereof is omitted.

For example, in the embodiment described above, the end portions of the adjacent foils 32 are pressed against each other in the circumferential direction at the intersecting portion P. In this case, as illustrated in FIG. 5B, along with the rotation of the shaft 6, the end portion of each of the foils on the downstream side in the rotation direction (vicinity of the projecting portions 32e) is pressed into each of the grooves 31b. Thus, the end portion of the adjacent one of the foils 32 on the upstream side in the rotation direction (vicinity of the projecting portion 32c) is also pressed into each of the grooves 31b. With this, the vicinity of the end portion of each of the foils 32 on the upstream side in the rotation direction enters each of the grooves 31b while being curved. Thus, the circumferential movement of the foils 32 (in particular, circumferential movement of each projecting portion 32c) is inhibited, thereby causing a fear of reducing the effect of damping the vibration of the shaft 6.

Figure 11A:
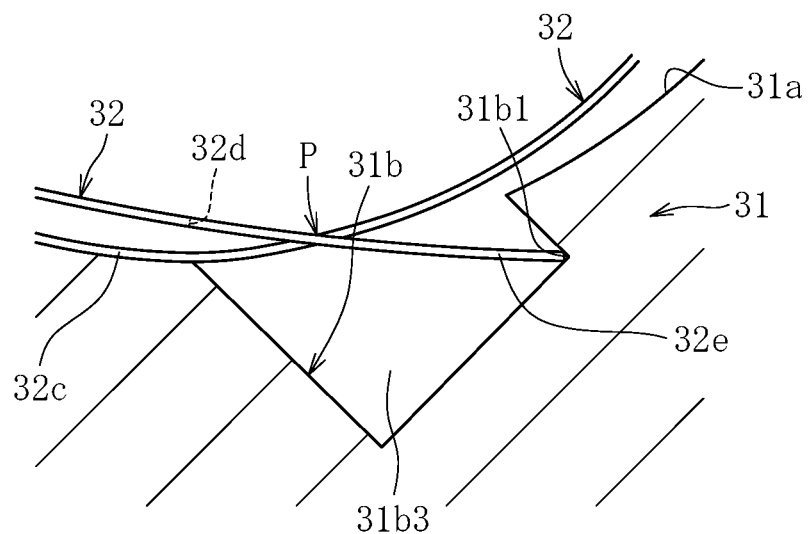
FIG. 11A is a sectional view for illustrating the vicinity of the groove of the foil holder of a radial foil bearing according to another embodiment of the present invention under the state in which the shaft is stopped.
Figure 11B:
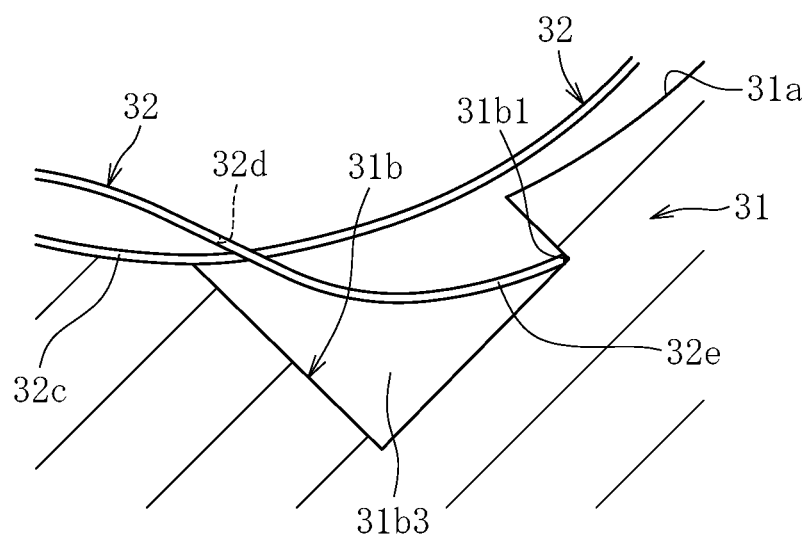
FIG. 11B is a sectional view for illustrating the vicinity of the groove of the foil holder of the radial foil bearing according to the another embodiment of the present invention under the state in which the shaft is rotated.

As a countermeasure, in an embodiment of the present invention, which is illustrated in FIG. 11A, the end portions of the adjacent foils 32 are not engaged with each other in the circumferential direction. Specifically, the circumferential dimension of each of the projecting portions 32e of each of the foils 32 is set larger than that in the embodiment described above, and the recessed portion 32d is arranged on the upstream side in the rotation direction (left side in FIG. 11A) with respect to the intersecting portion P. In this case, as illustrated in FIG. 11B, even when the end portion of each of the foils 32 on the downstream side in the rotation direction (vicinity of the projecting portions 32e) is pressed into each of the grooves 31b along with the rotation of the shaft 6, the end portion of each of the foils 32 on the upstream side in the rotation direction (vicinity of the projecting portion 32c) is not pressed into each of the grooves 31b, and is maintained in a shape extended along the inner peripheral surface 31a of the foil holder 31. With this, the circumferential movement of the vicinity of the end portion of each of the foils 32 on the upstream side in the rotation direction is not inhibited, thereby being capable of obtaining an excellent effect of damping the vibration.

Figure 12:
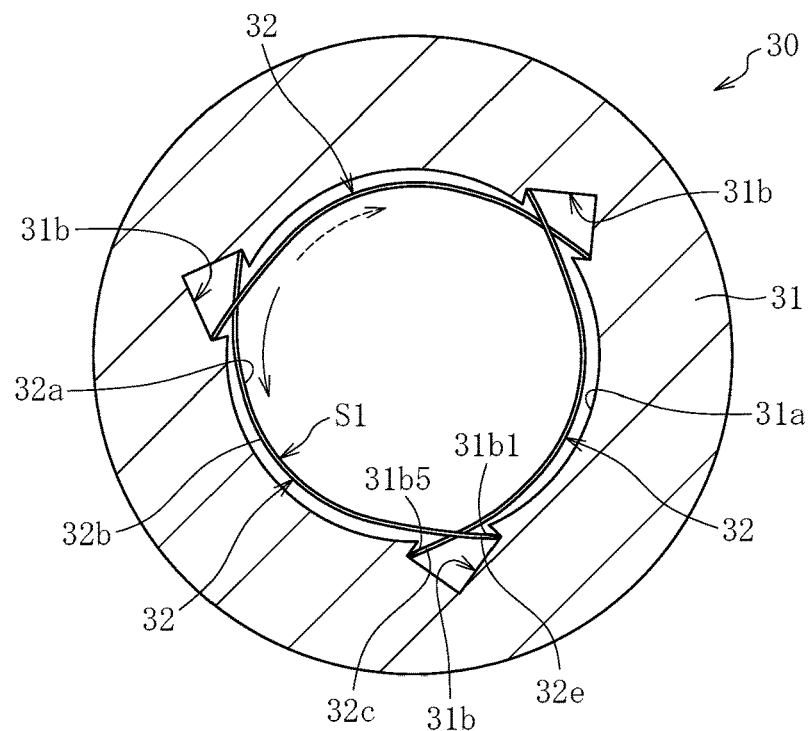
FIG. 12 is a sectional view for illustrating a radial foil bearing according to still another embodiment of the present invention.

An embodiment of the present invention, which is illustrated in FIG. 12, is different from the embodiments described above in that both the circumferential ends of each of the foils 32 are inserted into corresponding grooves 31b of the foil holder 31. In this embodiment, the end portions of the adjacent foils 32 (projecting portions 32e and projecting portion 32c) intersecting with each other are inserted into the common groove 31b. Each of the grooves 31b has the corner portion 31b1 configured to allow the one circumferential end (projecting portions 32e) of each of the foils to be brought into abutment thereagainst, and a corner portion 31b5 configured to allow the another circumferential end (projecting portion 32c) of each of the foils to be brought into abutment thereagainst. In this case, the movement of the foils 32 toward both sides in the circumferential direction can be restricted, thereby being capable of supporting the shaft 6 rotating in both the directions. That is, when the shaft 6 is rotated to one side in the circumferential direction (in a direction of the solid arrow in FIG. 12), the projecting portions 32e of each of the foils 32 are brought into abutment against the corner portion 31b1 of each of the grooves 31b, and the projecting portions 32e are curved in each of the grooves 31b (similarly to FIG. 5B or FIG. 11B). On the other hand, when the shaft 6 is rotated to another side in the circumferential direction (in a direction of the dotted arrow in FIG. 12), the projecting portion 32c of each of the foils 32 is brought into abutment against the corner portion 31b5 of each of the grooves 31b, and the projecting portion 32c is curved in each of the grooves 31b. As described above, the projecting portions 32e or the projecting portion 32c is curved in each of the grooves 31b. Thus, the amount of the sliding between the foils 32 and the foil holder 31 is increased similarly to the embodiments described above, thereby obtaining the effect of damping the vibration of the shaft 6.

Figure 13:
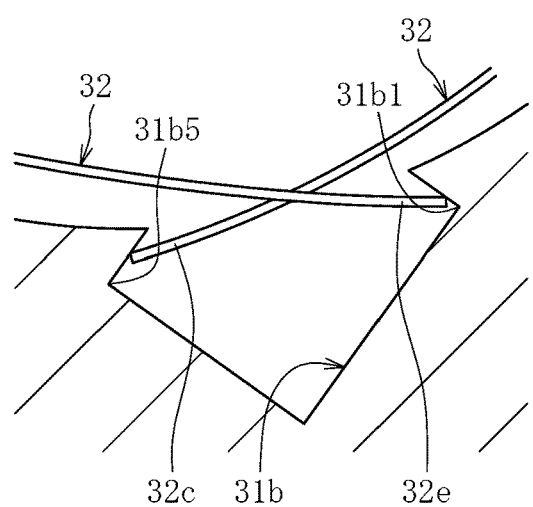
FIG. 13 is an enlarged view of FIG. 12.

In this case, the foils 32 are movable relative to the foil holder 31 in the circumferential direction. In this embodiment, as illustrated in FIG. 13, circumferential gaps are formed between both the circumferential ends of each of the foils 32 and the corner portions 31b1 and 31b5 of the corresponding grooves 31b, respectively. With this, under a state in which the end portion of each of the foils 32 on the one circumferential side is brought into abutment against the corner portion 31b1 of each of the grooves 31b, the end portion of each of the foils 32 on the another circumferential side is not brought into abutment against the corner portion 31b5 of each of the grooves 31b. Therefore, the circumferential movement of the foils 32 is allowed correspondingly to the gaps respectively formed between both the circumferential ends of each of the foils 32 and the corner portions 31b1 and 31b5 of the corresponding grooves 31b. As described above, the foils 32 are each held on the foil holder 31 under a state of having play in the circumferential direction. Thus, the amount of the sliding between the foils 32 and the foil holder 31 is increased, thereby being capable of enhancing the effect of damping the vibration of the shaft 6.

In the embodiment illustrated in FIG. 12, both the circumferential ends of each of the foils 32 may be held in abutment against the corner portions 31b1 and 31b5 of the corresponding grooves 31b, respectively.

The shape of each of the foils 32 of the radial foil bearing 30 is not limited to that in the embodiments described above. A foil 32 illustrated in FIG. 14 has a plurality of projecting portions 32c (two projecting portions 32c in the illustrated example), which are formed at one circumferential end thereof, and a plurality of recessed portions 32d (two recessed portions 32d in the illustrated example), which are formed at another circumferential end thereof, and are configured to allow the projecting portions 32c of the adjacent foil 32 to be fitted thereto. An axial width of each of the recessed portions 32d is slightly smaller than an axial width of each of the projecting portions 32c. Axial cutouts 32f are formed in corner portions on both axial sides of each of the recessed portions 32d. Both axial ends of each of the projecting portions 32c are inserted into the cutouts 32f of each of the recessed portions 32d while fitting each of the projecting portions 32c at the one circumferential end of each of the foils 32 to each of the recessed portions 32d of the adjacent one of the foils 32, to thereby assemble the plurality of foils 32 into a tubular shape.

Figure 14:
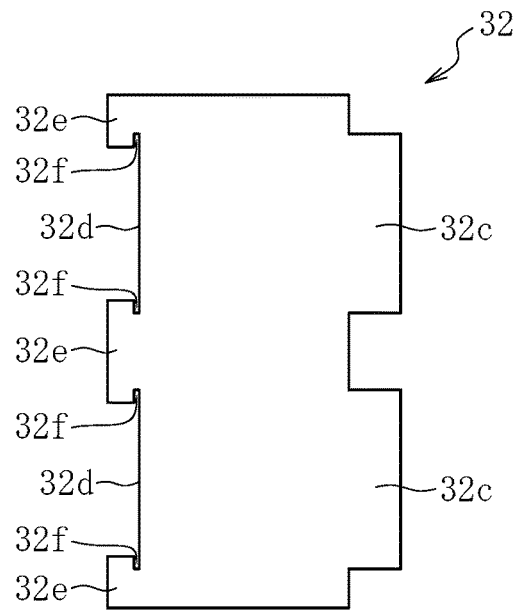
FIG. 14 is a plan view for illustrating another example of the foil.
Figure 15:
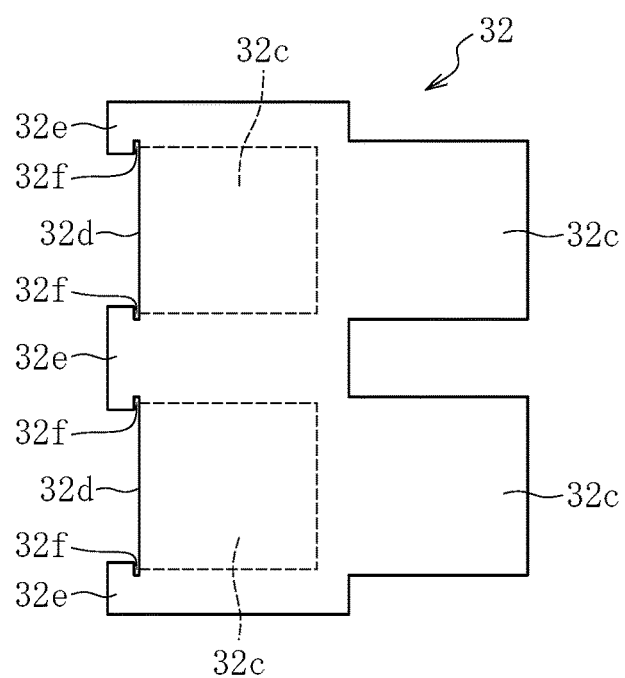
FIG. 15 is a plan view for illustrating another example of the foil.

A foil 32 illustrated in FIG. 15 is obtained by extending the projecting portions 32c at the one circumferential end of the foil 32 in FIG. 14 in the circumferential direction. In the illustrated example, the projecting portions 32c are each extended beyond a circumferential center of a body portion of the adjacent one of the foils 32 (rectangular region between the projecting portions 32c and 32e in the circumferential direction). As illustrated in FIG. 10, the projecting portions 32c of the adjacent one of the foils 32 are arranged on the radially outer side with respect to the part corresponding to the radial bearing surface S1 of each of the foils 32 (see the dotted lines of FIG. 15). At this time, the foils 32 override on the projecting portions 32c of the adjacent one of the foils 32, thereby forming a first spring element Q1 convexed radially inward, and a second spring element Q2 convexed radially outward in each of the foils 32. Therefore, the position of the boundary between the first spring element Q1 and the second spring element Q2 of each of the foils 32 (inflection point) is adjusted by adjusting a circumferential length of each of the projecting portions 32c of each of the foils 32, thereby being capable of imparting various spring characteristics to the bearing surface S1 of the foils 32.

Figure 16:
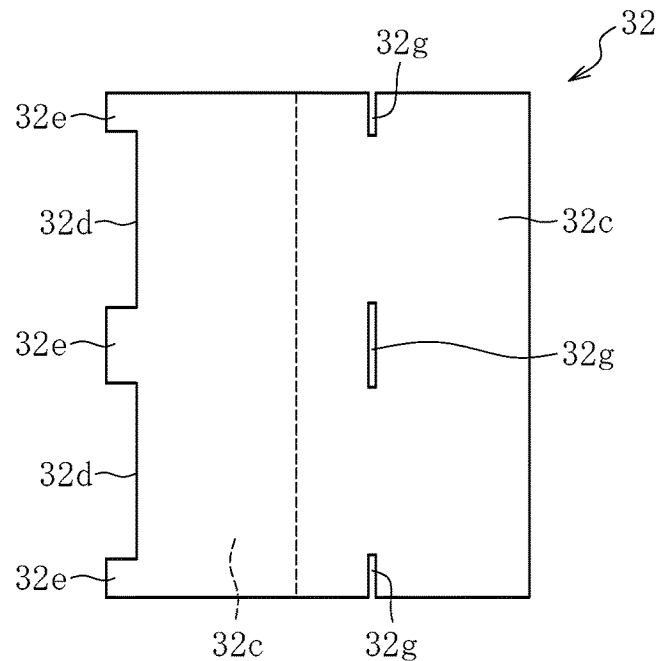
FIG. 16 is a plan view for illustrating another example of the foil.

Incidentally, the foil 32 illustrated in FIG. 15 swells at a part overriding on edges (in particular, both axial end edges) of each of the projecting portions 32c of the adjacent foil 32, thereby causing a fear of wearing the part significantly. As a countermeasure, as illustrated in FIG. 16, the projecting portion 32c of the foil 32 is formed continuously over an entire axial length of the foil 32. Thus, the adjacent foil 32 does not override on the axial end edges of the projecting portion 32c, thereby being capable of suppressing the wear of the foil 32. In this case, slits 32g are formed at the root portion of the projecting portion 32c of the foil 32, and are configured to allow the projecting portions 32e at the another circumferential end to be inserted therein.

Figure 17:
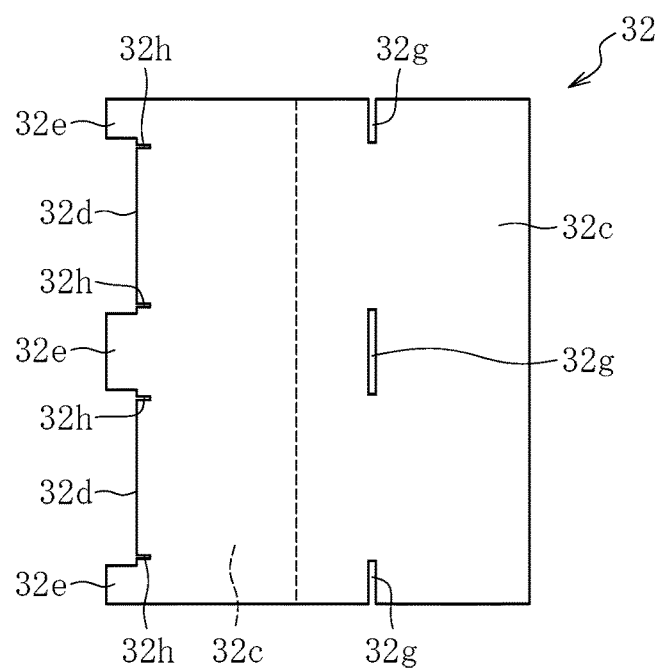
FIG. 17 is a plan view for illustrating another example of the foil.

In the foil 32 illustrated in FIG. 16, the projecting portions 32e are curved by being inserted into the groove 31b of the foil holder 31. Thus, the rigidity of the vicinity of each of the projecting portions 32e is increased, thereby causing a fear in that, when touchdown occurs (when the foil 32 is held in contact with the shaft), the foil 32 is not deformed flexibly to be locally held in contact (partial contact) with the shaft. As a countermeasure, as illustrated in FIG. 17, slits 32h are formed in the vicinity of a root portion of each of the projecting portions 32e of the foil 32. Thus, the rigidity of the vicinity of each of the projecting portions 32e is lowered, thereby being capable of preventing the partial contact. In the illustrated example, the slits 32h each extending in the circumferential direction are formed in both the axial ends of each of the recessed portions 32d.

Figure 18:
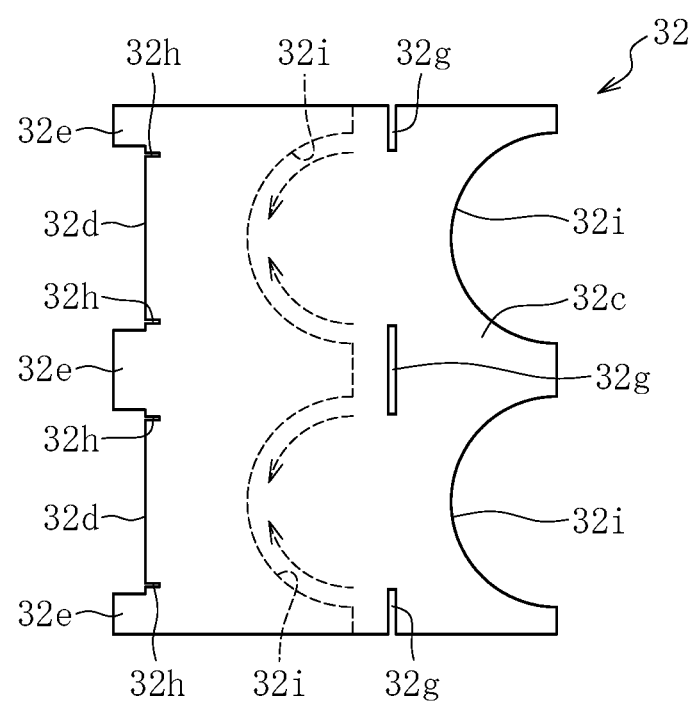
FIG. 18 is a plan view for illustrating another example of the foil.

A foil 32 of FIG. 18 is obtained by forming cutouts 32i having a herringbone pattern in the projecting portion 32c of the foil 32 of FIG. 17. The foil 32 overrides on the projecting portion 32c of the adjacent foil 32 so that a step along the cutouts 32i having a herringbone pattern is formed on the foil 32 (see the dotted line in FIG. 18). Air flows along the step having a herringbone pattern to be collected to the axial center side of each of the cutouts 32i, thereby increasing the pressure of an air film (see the dotted arrows in FIG. 18). Note that, in FIG. 18, the cutouts 32i having a herringbone pattern are formed in a plurality of rows. However, the cutouts 32i are not limited thereto, and the cutout 32i may be formed in a single row.

In the embodiments described above, description is made of the case where the radial foil bearing 30 and the thrust foil bearings 40 and 50 are integrated as the foil bearing unit 10, and then the foil bearing unit 10 is mounted to the gas turbine. However, the present invention is not limited thereto, and the foil bearings 30, 40, and 50 may be mounted to the gas turbine separately.

The foil bearing according to the present invention is applicable not only to the gas turbine described above, but may also be used as a bearing configured to support a rotor of a supercharger, for example. Further, the foil bearing according to the present invention may be used not only as turbo machines such as the gas turbine and the supercharger, but widely used also as bearings for vehicles such as automobiles, which are used under restrictions such as a difficulty in lubricating with a liquid such as a lubricating oil, a difficulty in separately arranging an auxiliary device of a lubricating oil circulatory system in view of energy efficiency, or problems that may be caused by shearing resistance of the liquid. The foil bearing according to the present invention may be widely used also as bearings for industrial devices.

Further, the foil bearings described above are each an air dynamic pressure bearing that uses air as a pressure generating fluid. However, the present invention is not limited thereto, and other gases or liquids such as water and oil may be used as the pressure generating fluid.

Next, embodiments of a third aspect of the present invention are described with reference to FIG. 19 to FIG. 30.

Figure 19:
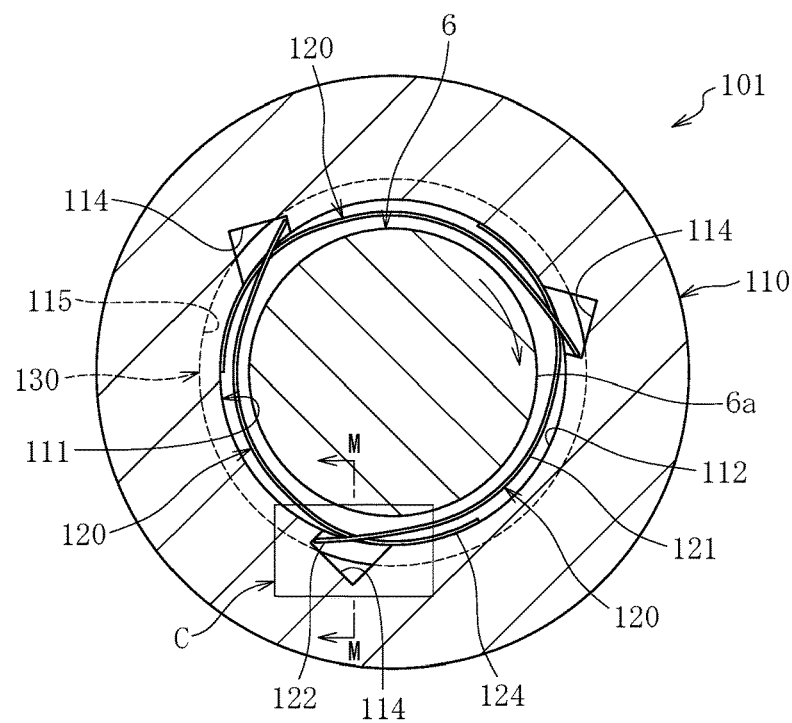
FIG. 19 is a sectional view for illustrating a foil bearing according to an embodiment of a third aspect of the present invention (sectional view taken along the line N-N in FIG. 20).

FIG. 19 is an illustration of a foil bearing 101 according to an embodiment of the present invention. The foil bearing 101 is assembled into, for example, the gas turbine as a type of the turbo machine, which is illustrated in FIG. 1. The foil bearing 101 is configured to support the shaft 6 of the turbine of the gas turbine, and is fixed to an inner periphery of the housing of the gas turbine.

The foil bearing 101 comprises a foil holder 110 having a tubular shape (cylindrical shape in the illustrated example), a plurality of foils 120 (three foils 120 in the illustrated example) mounted to an inner peripheral surface 111 of the foil holder 110, and a locking member 130.

Figure 20:
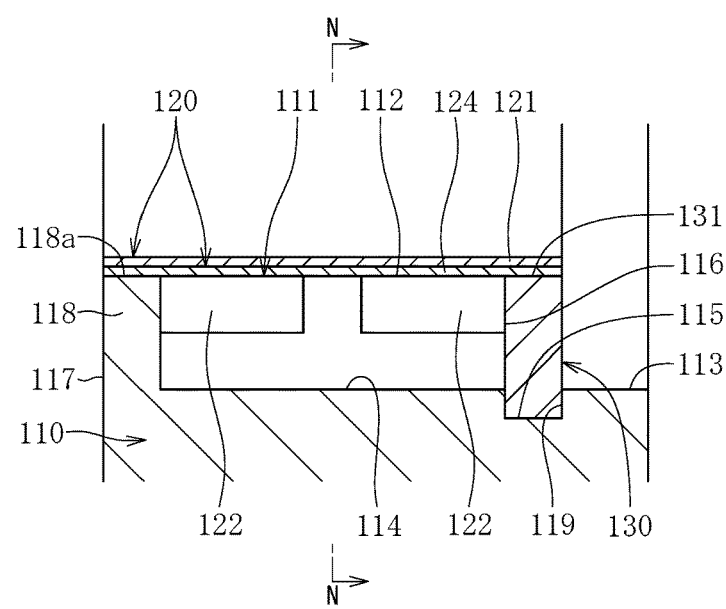
FIG. 20 is a sectional view for illustrating the foil bearing taken along the line M-M in FIG. 19.

The foil holder 110 is made of a metal or a resin. The foil holder 110 is integrally formed through die molding, and for example, is integrally formed through die molding of a sintered metal. As illustrated in FIG. 20, the inner peripheral surface 111 of the foil holder 110 has a small-diameter inner peripheral surface 112, and a large-diameter inner peripheral surface 113 formed on one axial side with respect to the small-diameter inner peripheral surface 112.

Grooves configured to allow the foils 120 to be mounted thereto are formed in the small-diameter inner peripheral surface 112 of the foil holder 110. In the illustrated example, a plurality of axial grooves 114 are formed in the small-diameter inner peripheral surface 112. Specifically, three axial grooves 114 are formed equiangularly. One axial end of each of the axial grooves 114 is opened to an end surface 116 formed on one axial side of the small-diameter inner peripheral surface 112. As described above, at least one of the end portions of each of the axial grooves 114 is opened to the end surface, thereby being capable of integrally forming the foil holder 110 including the axial grooves 114 through die molding. Another axial end of each of the axial grooves 114 does not reach an end surface 117 formed on another axial side of the small-diameter inner peripheral surface 112, and is closed by a locking portion 118 integrally formed on the foil holder 110. A circumferential groove 115 configured to allow the locking member 130 to be mounted thereto is formed at a portion located axially between the small-diameter inner peripheral surface 112 and the large-diameter inner peripheral surface 113. In this embodiment, the circumferential groove 115 is formed into an annular shape. A groove bottom (radially outer portion) of the circumferential groove 115 is larger in diameter than the large-diameter inner peripheral surface 113.

Each of the foils 120 is formed of a metal foil made of a metal that is excellent in resiliency and processability, such as a steel material or a copper alloy, and having a thickness of from approximately 20 μm to approximately 200 μm. It is preferred that the metal foil be made of stainless steel or bronze.

Figure 21A:
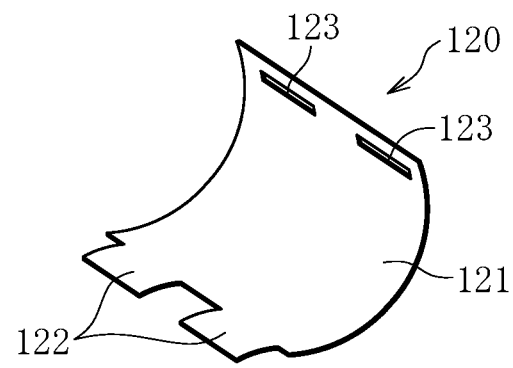
FIG. 21A is a perspective view for illustrating a foil of the foil bearing in FIG. 19.
Figure 21B:
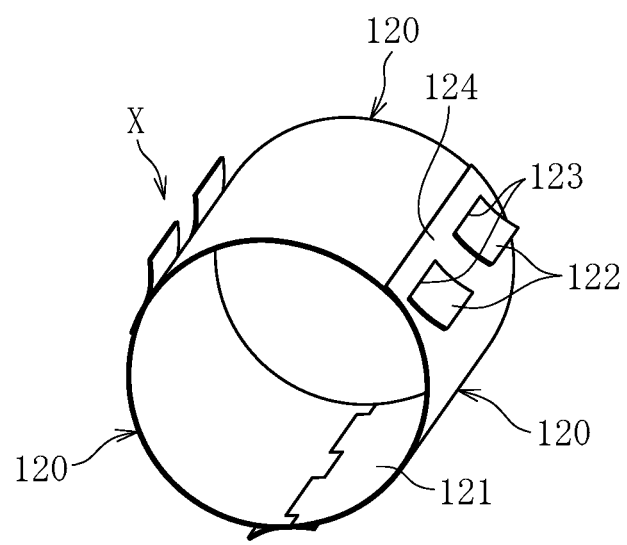
FIG. 21B is a perspective view for illustrating a temporary foil assembly obtained by temporarily assembling three foils illustrated in FIG. 21A.
Figure 22A:
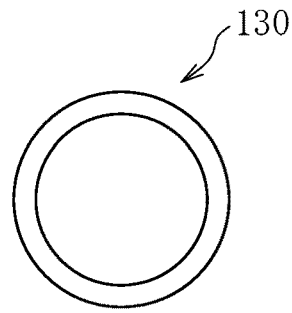
FIG. 22A is a front view for illustrating an example of a locking member (stopper ring).
Figure 22B:
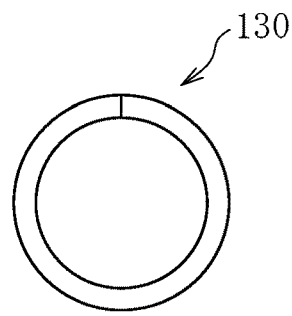
FIG. 22B is a front view for illustrating another example of the locking member (stopper ring).
Figure 22C:
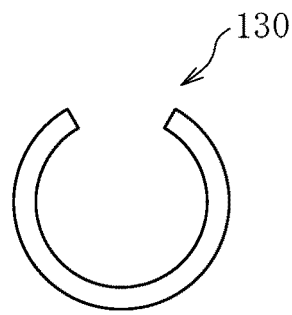
FIG. 22C is a front view for illustrating another example of the locking member (stopper ring).

The foils 120 are mounted to the inner peripheral surface 111 of the foil holder 110. In the illustrated example, three foils 120 are mounted to the small-diameter inner peripheral surface 112 of the foil holder 110 under a circumferentially arrayed state. Each of the foils 120 is integrally formed through press working, etching, or wire cutting on a single metal foil. As illustrated in FIG. 21A, each of the foils 120 comprises a body portion 121, projecting portions 122 serving as insertion portions formed on one circumferential side of the body portion 121, and slits 123 serving as mounting portions formed on another circumferential side of the body portion 121. In the illustrated example, the projecting portions 122 and the slits 123 are formed at a plurality of positions (two positions) separated from each other in the axial direction. The projecting portions 122 of another one of the foils 120 are mountable to the slits 123. In the illustrated example, the projecting portions 122 and the slits 123 of each of the foils 120 are formed at the same positions in the axial direction. An axial width of each of the slits 123 is slightly larger than an axial width of each of the projecting portions 122. As illustrated in FIG. 21B, the projecting portions 122 of each of the foils 120 are inserted into the slits 123 of adjacent one of the foils 120, thereby being capable of temporarily assembling the three foils 120 into a tubular shape.

As illustrated in FIG. 19, the insertion portions (projecting portions 122) of each of the foils 120 are inserted into each of the axial grooves 114 formed in the small-diameter inner peripheral surface 112 of the foil holder 110. A region of each of the foils 120, which is located on another circumferential side with respect to the slits 123, functions as an underfoil portion 124 to be arranged behind (on the radially outer side with respect to) the adjacent one of the foils 120. In this way, both the circumferential ends of each of the foils 120 are held in contact with the foil holder 110. Radially inner surfaces of the body portions 121 of the foils 120 function as a bearing surface. In the illustrated example, the three foils 120 form a multi-arc radial bearing surface. The adjacent foils 120 are intersected with each other in a circumferential region of an opening portion of each of the axial grooves 114 in the axial view. At the intersecting portion, end portions of the body portions 121 of the adjacent foils 120 are pressed against each other in the circumferential direction. Thus, the foils 120 are protruded radially outward to form a shape extending along the small-diameter inner peripheral surface 112 of the foil holder 110.

It is preferred that the locking member 130 be a single component configured to retain the projecting portions 122 of each of the plurality of foils 120. For example, the locking member 130 is a stopper ring. A shape of the stopper ring is not particularly limited. For example, there may be used an annular stopper ring that is continuous over the entire circumference (see FIG. 22A), an annular stopper ring that is partially cut (see FIG. 22B), or a C-shaped stopper ring (see FIG. 22C). The locking member 130 is made of a metal or a resin having high elasticity. The locking member 130 is mounted to the inner peripheral surface 111 of the foil holder 110. In this embodiment, as illustrated in FIG. 20, the locking member 130 is mounted to the circumferential groove 115 of the foil holder 110. An outer peripheral surface of the locking member 130 has a diameter that is larger than that of the large-diameter inner peripheral surface 113 and is substantially the same as that of the groove bottom of the circumferential groove 115. The locking member 130 is axially engageable with an inner wall 119 of the circumferential groove 115 on the one axial side and an inner wall (end surface 116) of the circumferential groove 115 on the another axial side. A radially inner surface 131 of the locking member 130 is arranged at the same radial position as the small-diameter inner peripheral surface 112 of the foil holder 110.

The locking member 130 is arranged at a position axially engageable with the projecting portions 122 of each of the foils 120. Specifically, as illustrated in FIG. 20, the locking member 130 is arranged adjacently to each of the foils 120 at one axial side of a part inserted into the axial groove 114 (pair of projecting portions 122). With this, the locking member 130 is held in abutment against the foils 120 at the one axial side, thereby restricting the movement of the foils 120 toward the one axial side. The locking portion 118 of the foil holder 110 is arranged adjacently to each of the foils 120 at another axial end side of the part inserted into the axial groove 114 (pair of projecting portions 122). With this, the locking portion 118 is held in abutment against each of the foils 120 at the another axial side, thereby restricting the movement of the foils 120 toward the another axial side. As described above, each of the foils 120 is engaged with the locking member 130 and the locking portion 118 at both the axial sides, thereby determining an axial position of each of the foils 120 with respect to the foil holder 110.

One axial end portion of the body portion 121 of each of the foils 120 (right end in FIG. 20) is extended more toward the one axial side than one axial end portion of the pair of projecting portions 122. With this, the radially inner surface 131 of the locking member 130 is covered by the body portions 121. On the other hand, another axial end portion of the body portion 121 of each of the foils 120 (left end in FIG. 20) is extended more toward the another axial side than another axial end portion of the pair of projecting portions 122. With this, an inner peripheral surface 118a of the locking portion 118 of the foil holder 110 is covered by the body portions 121. As described above, the body portion 121 of each of the foils 120 is extended to regions respectively covering radially inner sides of the locking member 130 and the locking portion 118, thereby being capable of increasing the area of the bearing surface. The axial end portions of each of the foils 120 may be further extended to axially outer sides beyond the locking member 130 and the locking portion 118, respectively.

The foil bearing 1 having the configuration described above is assembled by the procedure as described below.

First, the projecting portions 122 of each of the foils 120 are inserted into the slits 123 of the adjacent one of the foils 120 so that the three foils 120 are temporarily assembled into a tubular shape, thereby forming a temporary foil assembly X (see FIG. 21B).

Figure 23:
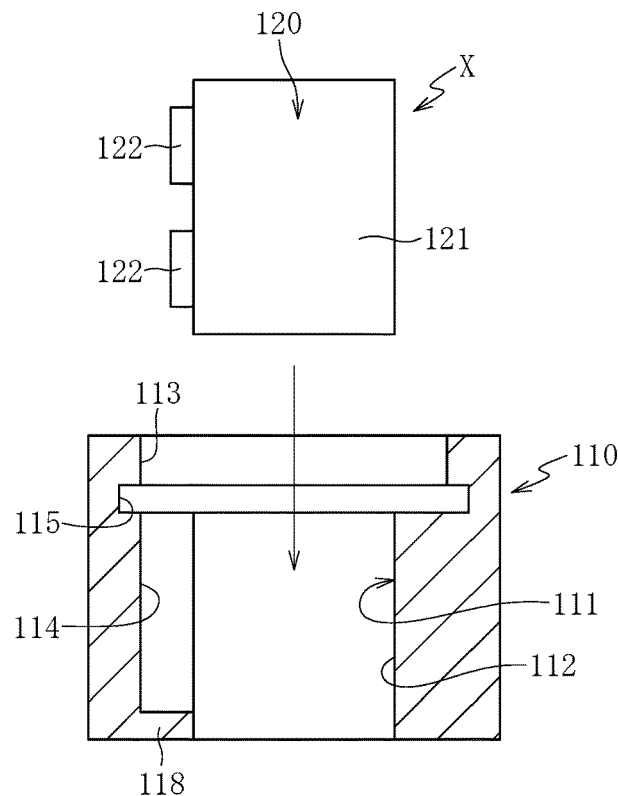
FIG. 23 is a sectional view for illustrating a state in which the temporary foil assembly is inserted into a foil holder.

Next, as illustrated in FIG. 23, the temporary foil assembly X is inserted along an inner periphery of the foil holder 110 while inserting the projecting portions 122 of each of the foils 120 of the temporary foil assembly X into each of the axial grooves 114 of the foil holder from the one axial side (opening side of each of the axial grooves 114). Then, the projecting portions 122 of each of the foils 120 are brought into abutment against an end portion of each of the axial grooves 114 (locking portion 118), thereby completing the insertion of the temporary foil assembly X into the foil holder 110.

Figure 24:
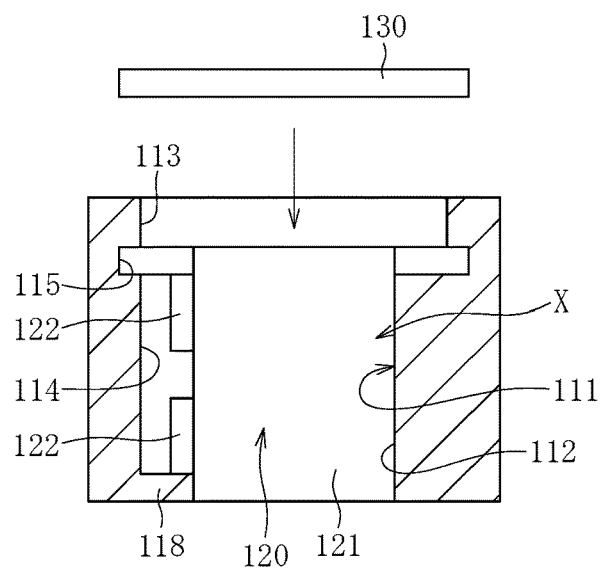
FIG. 24 is a sectional view for illustrating a state in which the locking member is mounted to the foil holder.

After that, as illustrated in FIG. 24, the locking member 130 is mounted to the circumferential groove 115 of the foil holder 110. Specifically, the locking member 130 is inserted into the foil holder 110 from one axial side of the foil holder 110 while being elastically deformed so as to pass through an inner periphery of the large-diameter inner peripheral surface 113. Then, when the locking member 130 reaches the circumferential groove 115, the locking member 130 is elastically restored so as to be fitted to the circumferential groove 115. In this way, the foil bearing 101 is completed.

As described above, the insertion portions (projecting portions 122) and the mounting portions (slits 123) are formed on each of the foils 120, thereby being capable of temporarily assembling the plurality of foils 120 before the plurality of foils 120 are mounted to the foil holder 110. With this, the assembly is facilitated and the productivity is enhanced as compared to a case where the foils 120 are mounted to the foil holder 110 one by one. In particular, the one axial end portion of each of the axial grooves 114 of the foil holder 110 is opened to the end surface 116 so that the projecting portions 122 of each of the temporarily assembled foils 120 can be inserted into each of the axial grooves 114 from the opening side in the axial direction, thereby further facilitating the assembly.

The shaft 6 is inserted along the inner periphery of the foil bearing 101 described above so that the foil bearing 101 is assembled into the gas turbine. Further, at the time of maintenance of the gas turbine, the shaft 6 is removed from the inner periphery of the foil bearing 101, and inspection work or component replacement is performed. After that, the shaft 6 is inserted again along the inner periphery of the foil bearing 101. When the shaft 6 is inserted into or removed from the inner periphery of the foil bearing 101 as described above, the shaft 6 and the foils 120 slide relative to each other so that an axial force is applied to the foils 120. In the foil bearing 101 described above, the foils 120 are not completely fixed to the foil holder 110 by welding or bonding so that the movement of the foils 120 relative to the foil holder 110 is allowed. Therefore, there is a risk of axial shift of the foils 120 relative to the foil holder 110 due to the sliding between the shaft 6 and the foil bearing 101 when the shaft 6 is inserted into or removed from the inner periphery of the foil bearing 101. In view of the risk, in this embodiment, as described above, the insertion portions (projecting portions 122) of each of the foils 120 are locked by the locking member 130 and the locking portion 118 from both the axial sides, thereby restricting the axial movement of the foils 120 relative to the foil holder 110. With this, it is possible to prevent the risk of the axial shift of the foils 120 relative to the foil holder 110 due to the sliding between the shaft 6 and the foil bearing 101 when the shaft 6 is inserted into or removed from the inner periphery of the foil bearing 101.

When the shaft 6 inserted along the inner periphery of the foil bearing 101 is rotated to the one side in the circumferential direction (direction of the arrow in FIG. 19), a radial bearing gap is formed between the bearing surface of the foils 120 of the foil bearing 101 and an outer peripheral surface 6a of the shaft 6, and a pressure of an air film generated in the radial bearing gap allows the shaft 6 to be supported in the radial direction.

Figure 25:
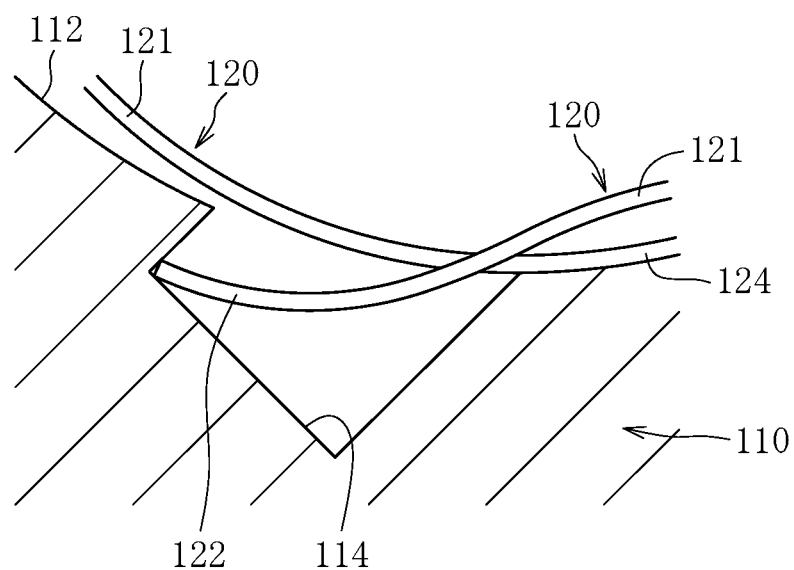
FIG. 25 is an enlarged view for illustrating the part C in FIG. 19.

At this time, the foils 120 are pressed toward the downstream side in the rotation direction due to the friction against the shaft 6 and the viscosity of the air, and as illustrated in FIG. 25, the body portion 121 of each of the foils 120 (bearing surface) is curved so as to be convexed radially inward. Then, when the pressure of the air film in the radial bearing gap is increased, the foils 120 are elastically deformed by being pressed radially outward. In this state, the shapes of the foils 120 are maintained at positions where elastic forces of the foils 120 and the pressure of the air film formed in the radial bearing gap are counterbalanced. In the illustrated example, the projecting portions 122 of each of the foils 120 are curved in each of the axial grooves 114 so as to be convexed radially outward.

During operation of the bearing, the foils 120 are pressed against the foil holder 110 due to an influence of the air film formed in the radial bearing gap. Along with this, slight sliding occurs between the foils 120 and the foil holder 110. Due to frictional energy generated by the slight sliding, vibration of the shaft 6 can be damped. In this embodiment, the plurality of foils 120 are mounted to the foil holder 110 by only inserting the projecting portions 122 of each of the foils 120 into each of the axial grooves 114. Therefore, the foils 120 are not completely fixed to the foil holder 110 so that the movement of the foils 120 relative to the foil holder 110 is allowed. In this case, during the rotation of the shaft 6, the foils 120 are moved relative to the foil holder 110 in the circumferential direction so that the amount of the sliding between the foils 120 and the foil holder 110 is increased, thereby further enhancing the effect of damping the vibration of the shaft 6. In the illustrated example, the end portion of each of the foils 120 on the upstream side in the rotation direction (underfoil portion 124) is arranged between the adjacent one of the foils 120 and the small-diameter inner peripheral surface 112 of the foil holder 110. Thus, the underfoil portion 124 slides in the circumferential direction under a state of being held in surface contact with the small-diameter inner peripheral surface 112 of the foil holder 110, thereby further enhancing the effect of damping the vibration of the shaft 6.

Figure 26:
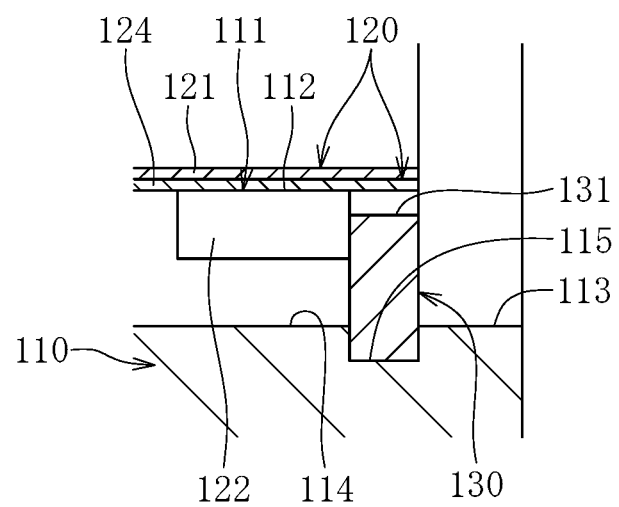
FIG. 26 is a sectional view for illustrating a foil bearing according to another embodiment of the present invention.

The present invention is not limited to the embodiments described above. For example, in an embodiment of the present invention, which is illustrated in FIG. 26, the radially inner surface 131 of the locking member 130 is arranged on the radially outer side with respect to the small-diameter inner peripheral surface 112 of the foil holder 110. With this, even when the shaft 6 is centrifugally whirled (conical movement), the foils can be bent radially outward. Thus, excessive interference between the shaft 6 and the foils 120 can be prevented to suppress the wear of the foils or the damage to the foils.

Figure 27:
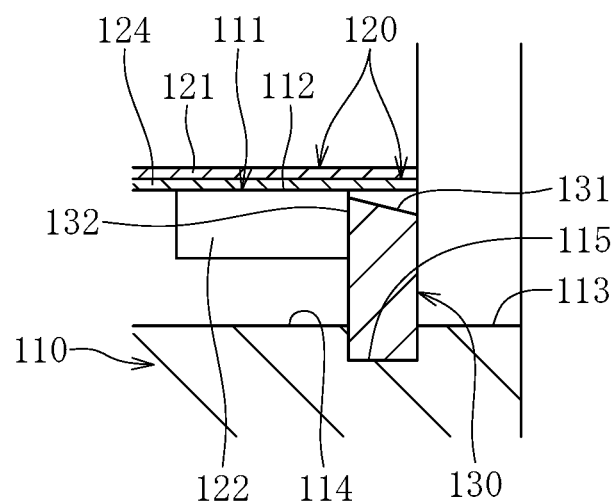
FIG. 27 is a sectional view for illustrating a foil bearing according to another embodiment of the present invention.
Figure 28:
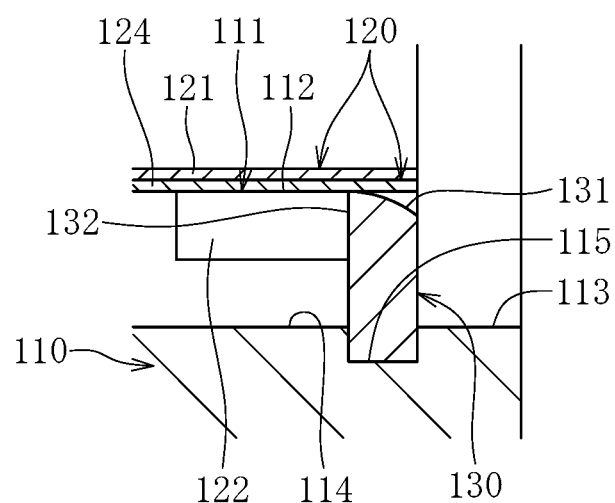
FIG. 28 is a sectional view for illustrating a foil bearing according to another embodiment of the present invention.

In embodiments of the present invention, which are illustrated in FIG. 27 and FIG. 28, the radially inner surface 131 of the locking member 130 is gradually increased in diameter toward the one axial side (right side in each of FIG. 27 and FIG. 28). Specifically, in FIG. 27, the radially inner surface 131 of the locking member 130 is a conical surface. On the other hand, in FIG. 28, the radially inner surface 131 of the locking member 130 has a circular-arc cross-sectional shape convexed radially inward. With this, as compared to the embodiment in FIG. 26, an end surface 132 of the locking member 130 on the another axial side (left side in FIG. 28) can be extended radially inward so that an abutment region between the end surface 132 and the projecting portion 122 of each of the foils 120 is increased, thereby being capable of securely retaining the foils 120. In particular, in the embodiment illustrated in FIG. 28, the radially inner surface 131 of the locking member 130 is smoothly continuous with the small-diameter inner peripheral surface 112 of the foil holder 110. Thus, an edge is not formed at the boundary portion between the radially inner surface 131 and the small-diameter inner peripheral surface 112, thereby being capable of securely preventing damage to each of the shaft 6, the foils 120, and the foil holder 110, which may be caused due to the centrifugal whirling of the shaft 6.

Figure 29:
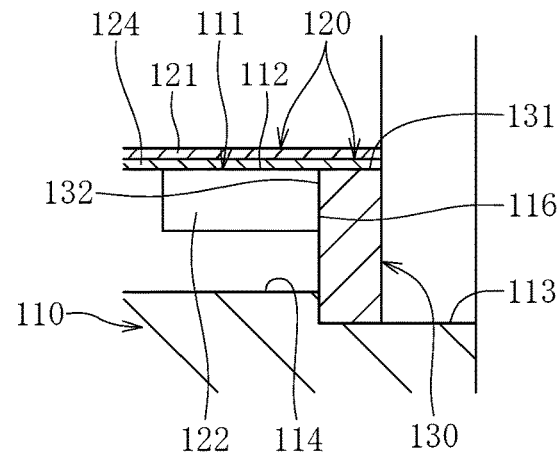
FIG. 29 is a sectional view for illustrating a foil bearing according to another embodiment of the present invention.

An embodiment of the present invention, which is illustrated in FIG. 29, is different from the embodiments described above in that the circumferential groove, which is configured to allow the locking member 130 to be mounted thereto, is not formed in the foil holder 110. In this embodiment, the locking member 130 is fitted to the large-diameter inner peripheral surface 113 of the foil holder 110, and the end surface 132 of the locking member 130 on the another axial side (left side in FIG. 29) is held in abutment against the end surface 116 (shoulder surface) of the foil holder 110. The locking member 130 is fixed to the foil holder 110 by bonding or press fitting to the large-diameter inner peripheral surface 113. Alternatively, the locking member 130 may be fixed to the foil holder 110 in a manner that the locking member 130 is arranged at the position illustrated in FIG. 29, and then the large-diameter inner peripheral surface 113 of the foil holder 110 is plastically deformed (crimped) radially inward. According to this embodiment, it is unnecessary to elastically deform the locking member 130 at the time of mounting to the foil holder 110, thereby expanding a range of options of materials for the locking member 130.

Figure 30A:
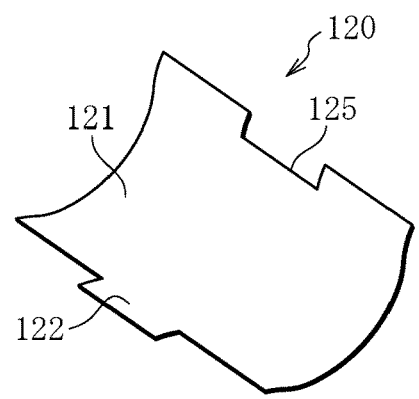
FIG. 30A is a perspective view for illustrating a foil according to another embodiment of the present invention.
Figure 30B:
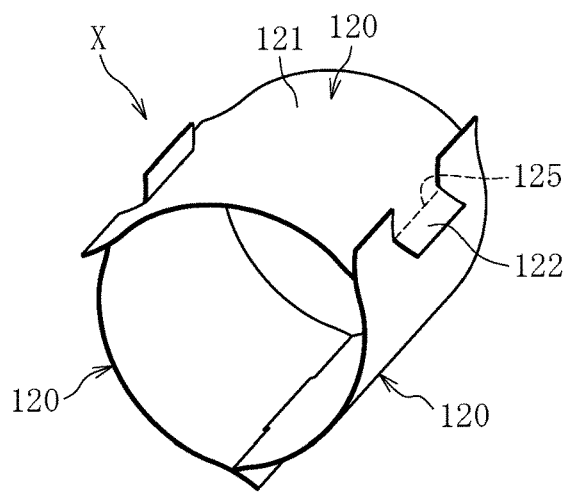
FIG. 30B is a perspective view for illustrating a state in which three foils illustrated in FIG. 30A are temporarily assembled.

In the embodiments described above, description is made of the case where the slits 123 are formed in each of the foils 120 as the mounting portions, but the present invention is not limited thereto. For example, as illustrated in FIG. 30A, a recessed portion 125 serving as a mounting portion may be formed at the another circumferential end portion of each of the foils 120. In this case, as illustrated in FIG. 30B, the projecting portion 122 of each of the foils 120 is inserted into the recessed portion 125 of the adjacent one of the foils 120, thereby being capable of temporarily assembling the plurality of foils 120.

In the embodiments described above, description is made of the structure in which the locking member 130 is arranged only on the one axial end of the foil holder 110, but the present invention is not limited thereto. The locking member 130 may be arranged at each of both axial ends of the foil holder 110. In this case, the axial grooves 114 may be formed over the entire axial length of the inner peripheral surface 111 of the foil holder 110, thereby further facilitating the processing for the axial grooves 114.

The foil bearing according to the present invention may be used not only as turbo machines such as the gas turbine and the supercharger, but widely used also as bearings for vehicles such as automobiles. The foil bearing according to the present invention may be widely used also as bearings for industrial devices.

The foil bearings described above are each an air dynamic pressure bearing that uses air as a pressure generating fluid. However, the present invention is not limited thereto, and other gases or liquids such as water and oil may be used as the pressure generating fluid.

Further, the configurations of the above-mentioned embodiments of the first to third aspects of the present invention are applicable in appropriate combination.

REFERENCE SIGNS LIST 6 shaft
10 foil bearing unit
20 rotary member
30 radial foil bearing (foil bearing)
31 foil holder
31b groove
31b1 corner portion
32 foil
40 thrust foil bearing
41 foil holder
42 foil
43 fixing member
50 thrust foil bearing
51 foil holder
52 foil
53 fixing member
P intersecting portion
S1 radial bearing surface
S2 thrust bearing surface
S3 thrust bearing surface

The invention claimed is:

1. A foil bearing, comprising:
a tubular foil holder; and
a plurality of foils arrayed on an inner peripheral surface of the tubular foil holder in a circumferential direction of the tubular foil holder, wherein
both circumferential ends of each of the plurality of foils are in direct contact with the tubular foil holder,
the plurality of foils are movable relative to the tubular foil holder in the circumferential direction,
the tubular foil holder has a plurality of grooves formed in the inner peripheral surface of the tubular foil holder,
each of the plurality of foils comprises:
a body portion having a bearing surface;
an insertion portion formed at one circumferential end portion thereof; and
a mounting portion formed at another circumferential end portion thereof,
the insertion portion of each of the plurality of foils is inserted into one of the plurality of grooves,
the insertion portion of each of the plurality of foils is mounted to the mounting portion of an adjacent one of the plurality of foils, and
the plurality of foils protrude radially outward in a manner that edges of the body portions of adjacent foils of the plurality of foils press against each other in the circumferential direction.

2. The foil bearing according to claim 1,
wherein the other circumferential end portion of each of the plurality of foils is arranged between adjacent one of the plurality of foils and the inner peripheral surface of the tubular foil holder.

3. The foil bearing according to claim 2, wherein each of the plurality of grooves has a corner portion, which is formed on an inner wall of each of the plurality of grooves, and is configured to allow the insertion portion of one of the plurality of foils to be brought into abutment against the corner portion.

4. The foil bearing according to claim 1, wherein the foil bearing is configured to support a shaft arranged in a direction parallel to a central axis of the foil bearing.

5. The foil bearing according to claim 1,
wherein the insertion portion of each of the plurality of foils is curvable in one of the grooves.

6. The foil bearing according to claim 1, wherein at least one axial end portion of each of the plurality of grooves is opened to an end surface of the tubular foil holder.

7. The foil bearing according to claim 1, further comprising a locking member, which is mounted to the tubular foil holder, and is engageable with the insertion portion of each of the plurality of foils from one axial side of the tubular foil holder.

8. The foil bearing according to claim 7, wherein one axial end portion of the body portion of each of the plurality of foils is extended more toward the one axial side than one axial end portion of the insertion portion.

9. The foil bearing according to claim 8, wherein a radially inner surface of the locking member is arranged on a radially outer side with respect to the inner peripheral surface of the tubular foil holder.

10. The foil bearing according to claim 8, wherein a radially inner surface of the locking member is gradually increased in diameter as approaching to the one axial side.

11. A foil bearing unit, comprising:
the foil bearing of claim 1; and
a rotary member inserted along an inner periphery of the foil bearing.

12. A turbo machine, comprising:
the foil bearing of claim 1; and
a shaft inserted along an inner periphery of the foil bearing.

13. A turbo machine, comprising:
the foil bearing unit of claim 11; and
a shaft fixed to an inner periphery of the rotary member, the rotary member and the shaft being supported by the foil bearing in a freely rotatable manner.

* * * * *